(12) United States Patent
Ishiyama

(10) Patent No.: US 11,983,864 B2
(45) Date of Patent: May 14, 2024

(54) OBJECT MATCHING DEVICE

(71) Applicant: NEC Corporation, Tokyo (JP)

(72) Inventor: Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 584 days.

(21) Appl. No.: 17/269,583

(22) PCT Filed: Aug. 23, 2018

(86) PCT No.: PCT/JP2018/031229
§ 371 (c)(1),
(2) Date: Feb. 19, 2021

(87) PCT Pub. No.: WO2020/039567
PCT Pub. Date: Feb. 27, 2020

(65) Prior Publication Data
US 2021/0312210 A1    Oct. 7, 2021

(51) Int. Cl.
*G06K 9/46* (2006.01)
*A61J 3/00* (2006.01)
(Continued)

(52) U.S. Cl.
CPC .............. *G06T 7/001* (2013.01); *A61J 3/007* (2013.01); *G06T 7/344* (2017.01); *G06T 7/70* (2017.01);
(Continued)

(58) Field of Classification Search
CPC ........... G06T 7/344; G06T 7/001; G06T 7/70; G06V 20/80; G06V 10/225; G06V 20/647;
(Continued)

(56) References Cited

U.S. PATENT DOCUMENTS

2003/0161504 A1    8/2003  Inoue
2011/0312376 A1*  12/2011  Woo .................... G06V 20/30
                                                                  455/556.1
(Continued)

FOREIGN PATENT DOCUMENTS

JP    2003-323622 A    11/2003
JP    2011-170745 A     9/2011
(Continued)

OTHER PUBLICATIONS

International Search Report for PCT Application No. PCT/JP2018/031229, dated Nov. 20, 2018.
JP Office Action for JP Application No. 2020-537980, dated Jul. 26, 2022 with English Translation.

*Primary Examiner* — Congvan Tran
(74) *Attorney, Agent, or Firm* — Sughrue Mion, PLLC

(57) ABSTRACT

An object matching device includes an acquiring unit, an extracting unit, and a determining unit. The acquiring unit acquires an image of an object to be matched with a character printed thereon. The extracting unit extracts a partial image of predetermined size including the character as a matching partial image from the image. The determining unit compares the matching partial image with a registration partial image acquired from an object to be registered and registered in advance, and thereby determines an identity of the object to be matched and the object to be registered.

10 Claims, 25 Drawing Sheets

(51) Int. Cl.
*G06T 7/00* (2017.01)
*G06T 7/33* (2017.01)
*G06T 7/70* (2017.01)
*G06V 10/22* (2022.01)
*G06V 10/24* (2022.01)
*G06V 10/44* (2022.01)
*G06V 10/75* (2022.01)
*G06V 20/64* (2022.01)
*G06V 20/80* (2022.01)

(52) U.S. Cl.
CPC ............ *G06V 10/225* (2022.01); *G06V 10/24* (2022.01); *G06V 10/44* (2022.01); *G06V 10/75* (2022.01); *G06V 20/647* (2022.01); *G06V 20/80* (2022.01); *A61J 2205/30* (2013.01); *A61J 2205/40* (2013.01)

(58) Field of Classification Search
CPC ........ G06V 10/44; G06V 10/75; G06V 10/24; A61J 3/007; A61J 2205/40; A61J 2205/30
See application file for complete search history.

(56) References Cited

U.S. PATENT DOCUMENTS

| | | | |
|---|---|---|---|
| 2012/0076417 A1* | 3/2012 | Yoshii | G06V 10/50 382/190 |
| 2012/0128247 A1 | 5/2012 | Kimura et al. | |
| 2015/0302255 A1 | 10/2015 | Gershtein et al. | |
| 2016/0189392 A1* | 6/2016 | Tsuji | G06T 7/44 382/103 |
| 2018/0018013 A1* | 1/2018 | Fukuchi | H04N 21/4222 |
| 2019/0087678 A1 | 3/2019 | Ito | |
| 2019/0279394 A1 | 9/2019 | Yonezawa et al. | |
| 2020/0160036 A1* | 5/2020 | Kato | H04L 63/0861 |

FOREIGN PATENT DOCUMENTS

| | | |
|---|---|---|
| JP | 2012-022413 A | 2/2012 |
| JP | 2012-108752 A | 6/2012 |
| JP | 2015-512075 A | 4/2015 |
| JP | 2017-097389 A | 6/2017 |
| JP | 2017-208032 A | 11/2017 |
| JP | 2017-217784 A | 12/2017 |
| WO | 2013/018613 A1 | 2/2013 |
| WO | 2018/016214 A1 | 1/2018 |

* cited by examiner

FIG. 11

| REGISTRATION PARTIAL IMAGE 45-1 | REGISTRATION OUTLINE DATA 46-1 |
|---|---|
| REGISTRATION PARTIAL IMAGE 45-2 | REGISTRATION OUTLINE DATA 46-2 |
| ⋮ | ⋮ |
| REGISTRATION PARTIAL IMAGE 45-2 | REGISTRATION OUTLINE DATA 46-n |

OBJECT MATCHING DEVICE

This application is a National Stage Entry of PCT/JP2018/031229 filed on Aug. 23, 2018, the contents of all of which are incorporated herein by reference, in their entirety.

TECHNICAL FIELD

The present invention relates to an object matching device, an object matching method, an object printing device, an object printing method, and a recording medium.

BACKGROUND ART

In recent years, the problem of counterfeit pharmaceutical products has become more serious. In developing countries and emerging countries, tablets are taken out of the packages and sold. Therefore, there is a demand for authenticity determination in tablet units.

Patent Document 1 describes an example of a technique for performing authenticity determination in tablet units. The technique described in Patent Document 1 (hereinafter referred to as the related technique of the present invention) is a device which prints characters on tablets. In the device, a random pattern caused by fine unevenness on the tablet surface distributed in a predetermined region which is close to the tablet peripheral portion and which does not include a character is acquired and registered as registration data beforehand. Then, at the time of matching, authenticity determination (genuineness determination) is performed by comparing image data of the random pattern acquired from the same predetermined region of a tablet to be matched with the registration data. The reason why the related technique of the present invention sets a tablet surface including no character as a predetermined region is that the device printing a character on a tablet acquires matching data from either an image before character printing or an image after character printing, acquires registration data from the other, and calculates a correlation value between the two data.

Patent Document 1: Japanese Unexamined Patent Application Publication No. JP-A 2017-097389

In the related technique of the present invention, a random pattern caused by the fine unevenness formed on the tablet surface in the process of producing each tablet is used for authenticity determination. However, since the random pattern caused by the fine unevenness on the tablet surface is hard to see visually in the first place, it is basically difficult to capture a clear image. The related technique of the present invention makes an improvement by using a ring lighting unit to acquire a random pattern from the peripheral portion where shadow appears more sharply than in the central portion. However, a special lighting device such as a ring lighting unit is necessary. Moreover, the position of a camera needs to be accurate. Therefore, it is difficult for an ordinary person who does not have a special lighting device such as a ring lighting unit to obtain a clear random pattern from a tablet to be matched by using a smartphone camera or the like. As a result, there is a problem that the accuracy of matching decreases. Such a problem may occur not only in the case of a tablet but also in the case of any object having an object-specific random pattern.

SUMMARY

An object of the present invention is to provide an object matching device that solves the abovementioned problem.

An object matching device according to an aspect of the present invention includes: an acquiring unit configured to acquire an image of an object to be matched with a character printed thereon; an extracting unit configured to extract a partial image of predetermined size including the character as a matching partial image from the image; and a determining unit configured to compare the matching partial image with a registration partial image acquired from an object to be registered and registered in advance, and thereby determine an identity of the object to be matched and the object to be registered.

Further, an image printing device according to another aspect of the present invention includes: a printing unit configured to print a character on an object to be registered; an acquiring unit configured to acquire an image of the object with the character printed thereon; an extracting unit configured to extract a partial image of predetermined size including the character as a registration partial image from the image; and a storing unit configured to have the registration partial image stored therein as data for determining an identity of the object.

Further, an object matching method according to another aspect of the present invention includes: acquiring an image of an object to be matched with a character printed thereon; extracting a partial image of predetermined size including the character as a matching partial image from the image; and comparing the matching partial image with a registration partial image acquired from an object to be registered and registered in advance, and thereby determining an identity of the object to be matched and the object to be registered.

Further, an object printing method according to another aspect of the present invention includes: printing a character on an object to be registered; acquiring an image of the object with the character printed thereon; extracting a partial image of predetermined size including the character as a registration partial image from the image; and storing the registration partial image as data for determining an identity of the object.

Further, a non-transitory computer-readable recording medium according to another aspect of the present invention has a program recorded thereon. The program includes instructions for causing a computer to function as: an acquiring unit configured to acquire an image of an object to be matched with a character printed thereon; an extracting unit configured to extract a partial image of predetermined size including the character as a matching partial image from the image; and a determining unit configured to compare the matching partial image with a registration partial image acquired from an object to be registered and registered in advance, and thereby determine an identity of the object to be matched and the object to be registered.

Further, a non-transitory computer-readable recording medium according to another aspect of the present invention has a program recorded thereon. The program includes instructions for causing a computer to function as: an acquiring unit configured to acquire an image of an object to be registered with a character printed thereon; an extracting unit configured to extract a partial image of predetermined size including the character as a registration partial image from the image; and a registering unit configured to register the registration partial image as data for determining an identity of the object into a storing unit.

With the configurations described above, the present invention allows object matching with high matching accuracy.

BRIEF DESCRIPTION OF DRAWINGS

FIG. 11 shows an example of registration information of a database in the table printing device according to the first example embodiment of the present invention;

EXAMPLE EMBODIMENTS

Next, example embodiments of the present invention will be described in detail with reference to the drawings.

First Example Embodiment

First, a tablet printing device according to a first example embodiment of the present invention will be described.

The tablet printing device according to this example embodiment is configured to print a character on a tablet to be registered by inkjet printing. Moreover, the tablet printing device is configured to acquire an image obtained by capturing the tablet with the character printed thereon. Moreover, the tablet printing device is configured to extract a partial image of predetermined size including the character from the abovementioned image as a registration partial image. Moreover, the tablet printing device is configured to extract outline data of the tablet from the abovementioned image as registration outline data. Moreover, the tablet printing device is configured to store the registration partial image and the registration outline data as data for determining the identity of the tablet.

Figure 1:
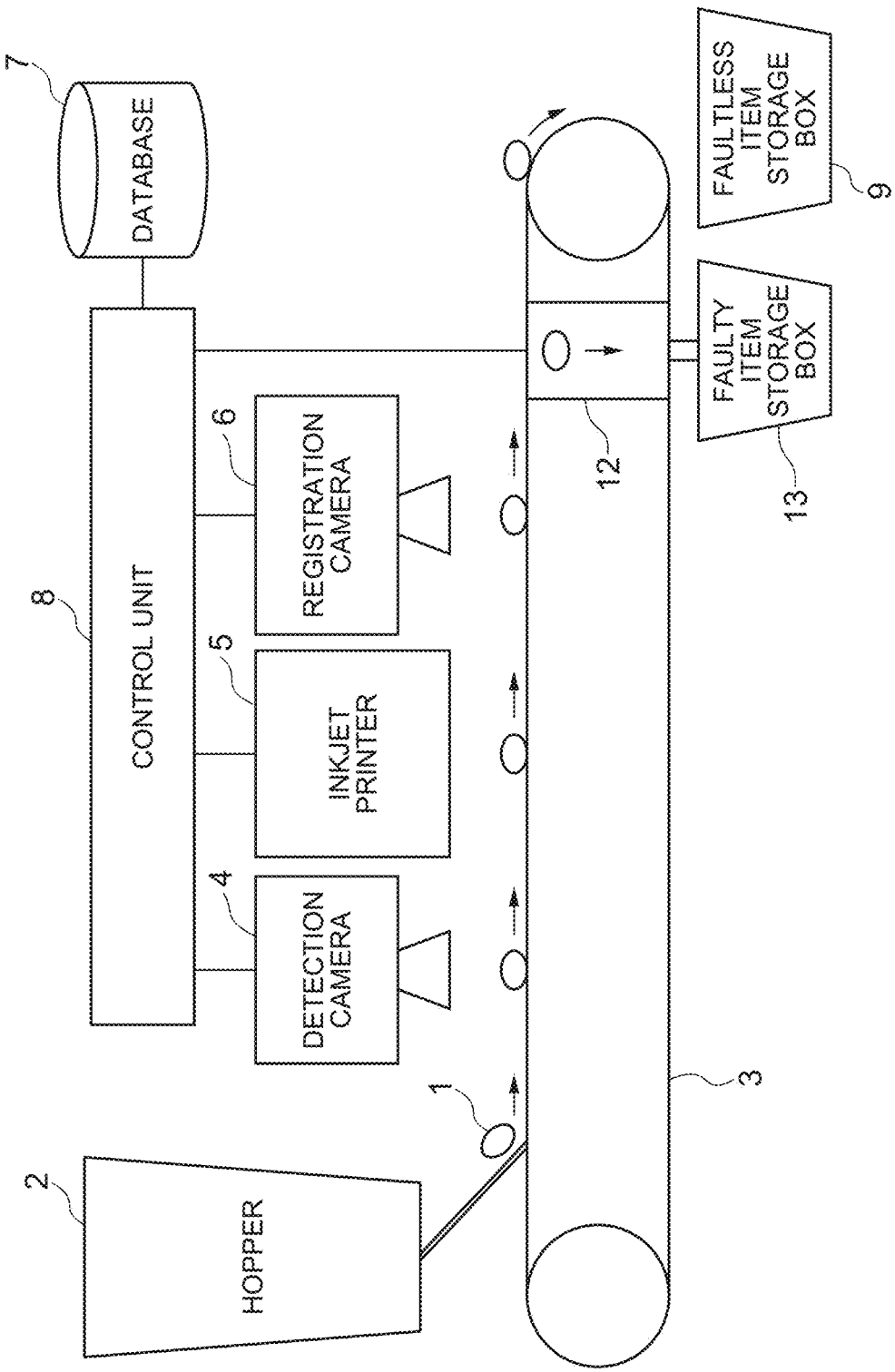
FIG. 1 is a view showing a configuration of a tablet printing device according to a first example embodiment of the present invention.

FIG. 1 is a view showing a configuration of the tablet printing device according to this example embodiment. Referring to FIG. 1, the tablet printing device according to this example embodiment includes a hopper 2 for supplying a tablet 1, and a belt conveyor 3 for conveying the tablet 1 supplied by the hopper 2. The belt conveyor 3 may have a guide, which is not shown in the drawings, for stabilizing the posture (orientation) of the tablet 1 being conveyed. For example, the belt conveyor 3 may have a guide composed of recesses aligned along a conveying direction. The tablet 1 supplied from the hopper 2 is partly housed in the recess of the guide, and its posture is thereby stabilized.

Further, the tablet printing device according to this example embodiment includes a detection camera 4 for detecting the tablet 1 on the belt conveyor 3, an inkjet printer 5 that prints a character on the tablet 1 detected by the detection camera 4, a registration camera 6 that acquires an image of the tablet 1 on which the inkjet printer 5 has printed, a database 7, a control unit 8, a faultless item storage box 9, a faulty item discharge unit 12, and a faulty item storage box 13.

The detection camera 4 is an image capturing unit that captures an image of the tablet 1 conveyed on the belt conveyor 3 from above a predetermined place of the belt conveyor 3. The control unit 8 can analyze the image captured by the detection camera 4 and thereby detect whether the tablet 1 is present or not in the predetermined place of the belt conveyor 3 and, if the tablet 1 is present, detect the accurate position and posture (orientation) of the tablet 1, and so on.

The inkjet printer 5 is a printing unit that prints a predetermined character on the tablet 1. A printed character is determined in advance. Moreover, in this example embodiment, a "character" is not limited to a character having a narrow meaning such as katakana, hiragana and alphabet, but includes a symbol, a figure, and so on. The color of a character is set to a color that can be definitely distinguished from the surface color of the tablet 1. Moreover, the size and shape of a character are set so that all characters can entirely fit on the tablet 1. A printing operation of the inkjet printer 5 is controlled by the control unit 8.

The control unit 8 detects the position, posture and so on of the tablet 1 based on an image captured by the detection camera 4, and controls the inkjet printer 5 at a timing when a designated character is printed in a designated position of the tablet 1 on the belt conveyor 3 based on the detected information.

Figure 2:
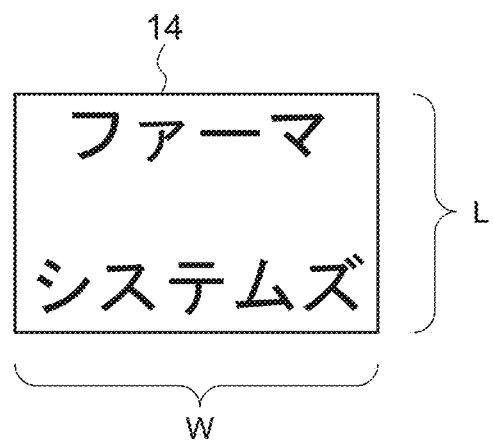
FIG. 2 is a view showing an example of image data used as printing data in the first example embodiment of the present invention.

FIG. 2 shows an example of image data 14 used as printing data. The image data 14 of this example is an example in which a character string composed of "ファーマ" and "システムズ" is printed in two rows at predetermined character intervals using a predetermined font. The color of the characters in the image data 14 is set to a different color from the surface color of the tablet 1. Moreover, the background color of the characters in the image data 14 is set to be colorless, for example. Moreover, the horizontal and vertical sizes of the image data 14 are W and H, respectively. The arrangement of the characters may be set so that the horizontal and vertical sizes of the circumscribed rectangle of the character strings in the image data are the same as the abovementioned W and H. Alternatively, a frame representing the outline of the image data 14 may be set with a different color from the surface color of the tablet 1. The image data 14 is also referred to as a reference image of characters or a reference character pattern.

Figure 3:
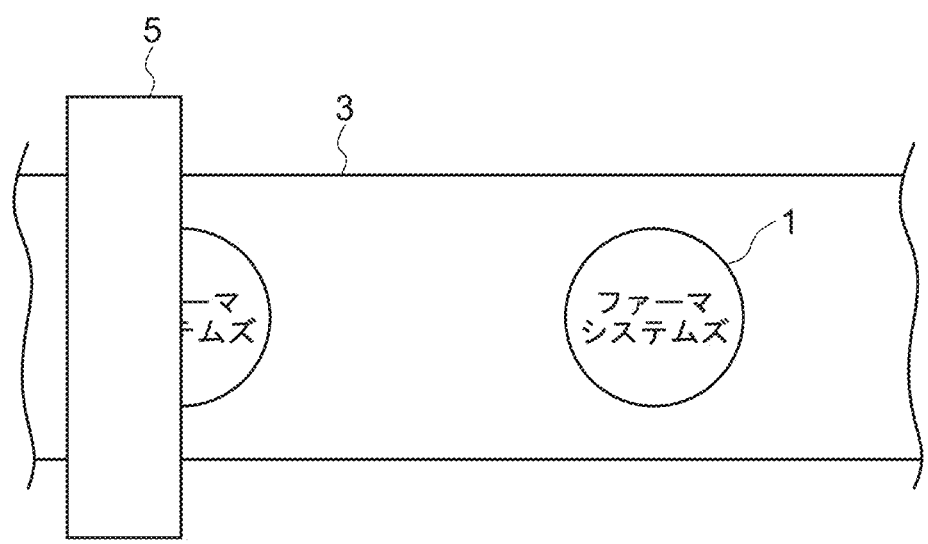
FIG. 3 is a view showing how an inkjet printer prints on a tablet in the first example embodiment of the present invention.

FIG. 3 is a view showing how the inkjet printer 5 prints on the tablet 1. Referring to FIG. 3, characters "ファーマ" and "システムズ" are printed on the tablet 1 when the tablet 1 passes under the print head (not shown) of the inkjet printer 5 by the belt conveyor 3. Regardless of the posture of the tablet 1 at the time of printing, when a state in which the image data 14 is printed on the tablet 1 is observed from directly above, the horizontal and vertical sizes of the image data 14 printed on the tablet 1 and the shape and size of the characters match those of the image data 14 used as printing data. The reason is as follows.

Figure 4A:
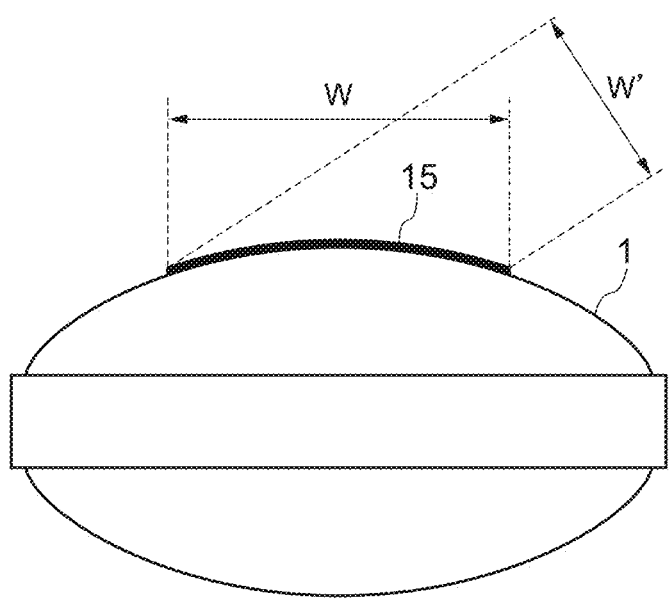
FIG. 4A is a schematic view showing a printed site made by printing a line segment pattern of length W on a tablet having a posture facing a print head in the first example embodiment of the present invention.
Figure 4B:
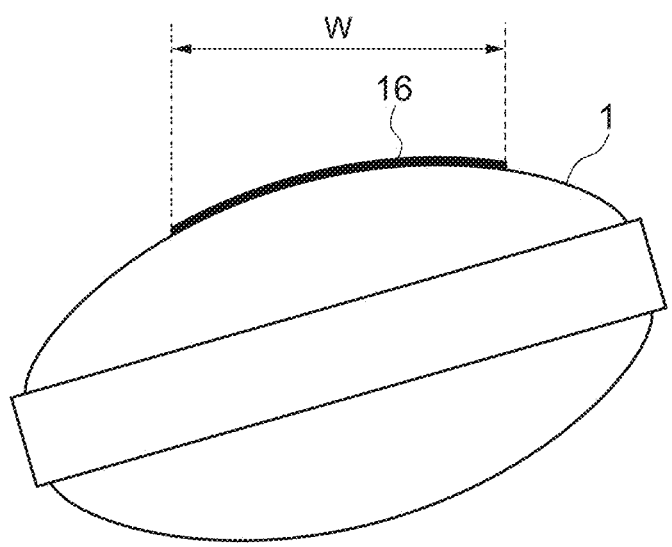
FIG. 4B is a schematic view showing a printed site made by printing the line segment pattern of length W on a tablet having a posture not facing the print head in the first example embodiment of the present invention.
Figure 5:
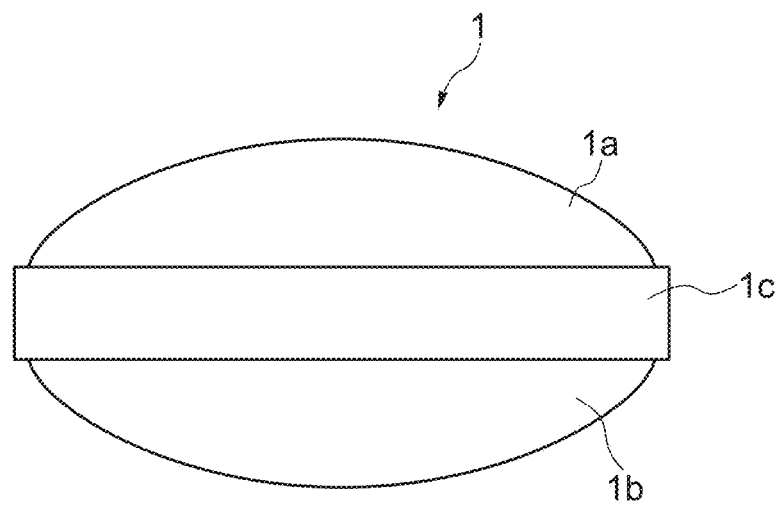
FIG. 5 is a view showing an example of the shape of a tablet.

FIG. 4A shows a printed site 15 formed by printing a line segment pattern of length W on the tablet 1 having a posture facing the print head. FIG. 4B shows a printed site 16 formed by printing a line segment pattern of length W on the tablet 1 having a posture not facing the print head. Both the printed sites 15 and 16 appear to have the same lengths W as long as observed from the print head side. Therefore, as described above, regardless of the posture of the tablet 1 at the time of printing, the horizontal and vertical sizes of the image data 14 printed on the tablet 1 and the shape and size of the characters match those of the image data 14 used as printing data. A state in which the tablet 1 faces the print head is a state in which when the shape of the tablet 1 is defined by a curved face portion 1a where the characters are printed, a curved face portion 1b on the opposite side, and a side face portion 1c therebetween, the curved face portion 1a faces the print head, for example, as shown in FIG. 5.

The registration camera 6 is an image capturing unit that captures an image including the entire tablet 1 from directly above at a timing when the tablet 1 after printing by the inkjet printer 5 is conveyed directly below the camera 6. Therefore, when the tablet 1 maintains the same posture from the printing position to a place where the registration camera 6 captures an image, the horizontal and vertical sizes of the printed image data 14 in the image of the tablet 1 captured by the registration camera 6 and the shape and size of the characters match those of the image data 14. On the other hand, even if the same image data 14 is printed, the shape and arrangement of dots of the printed site formed by fine ink particles ejected from the printer head are determined by many factors such as the unevenness of a place where the ink particles land, the posture of the tablet at the time of printing and uneven ink penetration, so that the shape and arrangement of the dots can never be the same and are extremely difficult to be reproduced later. Therefore, a random pattern on the printed site with ink can be used as data for determining the identity of the tablet. Therefore, the registration camera 6 is configured to acquire an image of the tablet 1 with a resolution at which the shape and arrangement of dots formed by ink ejected from the inkjet printer 5 for printing the image data 14 can be discriminated.

Figure 6A:
FIG. 6A is a view showing an example of a top view of a tablet with image data printed thereon in the first example embodiment of the present invention.
Figure 6B:
FIG. 6B is an enlarged view of part of a character portion in the image data printed on the tablet in the first example embodiment of the present invention.

FIG. 6A shows an example of the top views of three tablets with the image data 14 printed. FIG. 6B shows an enlarged view of characters "テ" in the image data 14 printed on the three tablets. As shown in FIG. 6B, even with the same character "テ", the shapes and arrangements of the dots on the printed sites composing the characters are different from each other.

Referring to FIG. 1 again, the faulty item discharge unit 12 operates so as to discharge the tablet 1 conveyed on the belt conveyor 3 to the faulty item storage box 13 under control by the control unit 8.

The faulty item storage box 13 is a discharge place for storing a faulty tablet discharged by the faulty item discharge unit 12. The faultless item storage box 9 is a storage place for storing the faultless tablet 1 not discharged by the faulty item discharge unit 12.

The control unit 8 checks the printing state of the tablet 1 based on the image of the tablet 1 captured by the registration camera 6 and, in the case of printing failure, controls the faulty item discharge unit 12 so that the faulty tablet 1 is discharged to the faulty item storage box 13. Moreover, in the case of the tablet 1 with no printing failure, the control unit 8 acquires data for determining the identity of the tablet from the image of the tablet 1 captured by the registration camera 6 and registers the data into the database 7.

Figure 7:
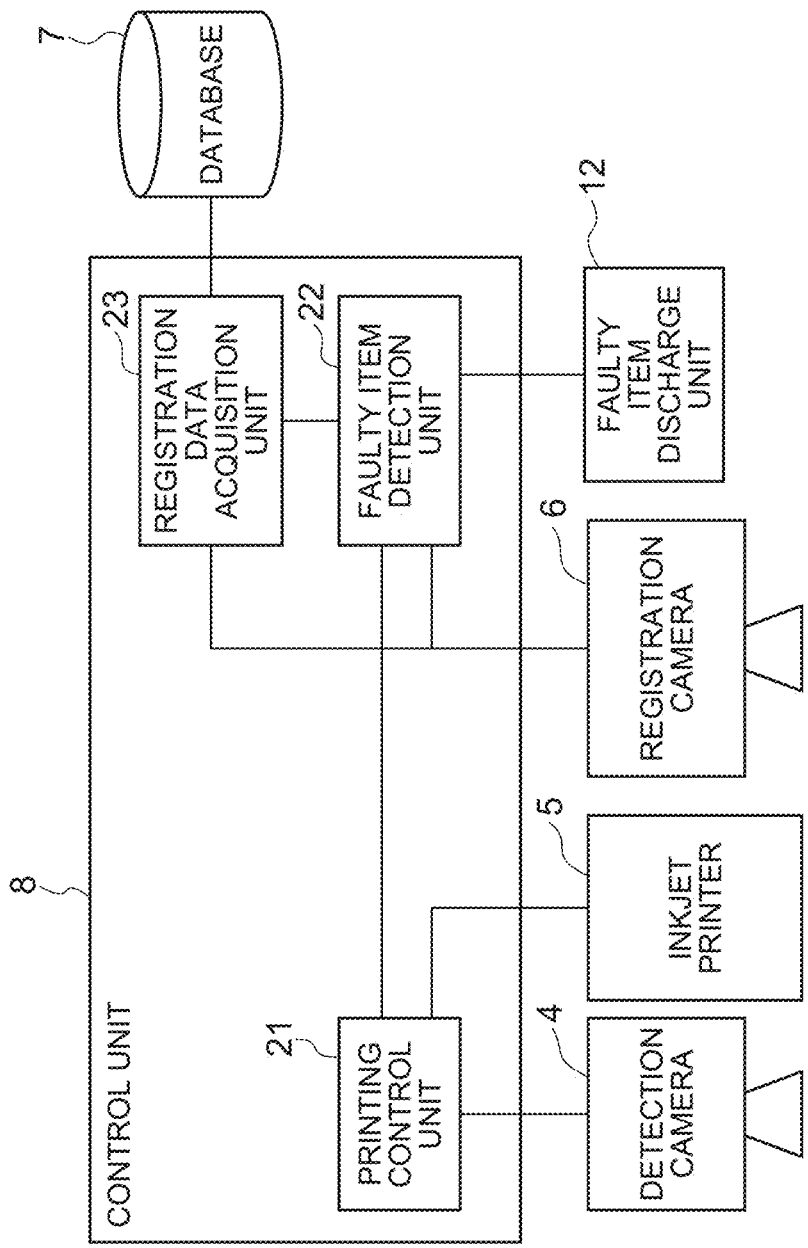
FIG. 7 is a block diagram of a control unit of the tablet printing device according to the first example embodiment of the present invention.
Figure 8:
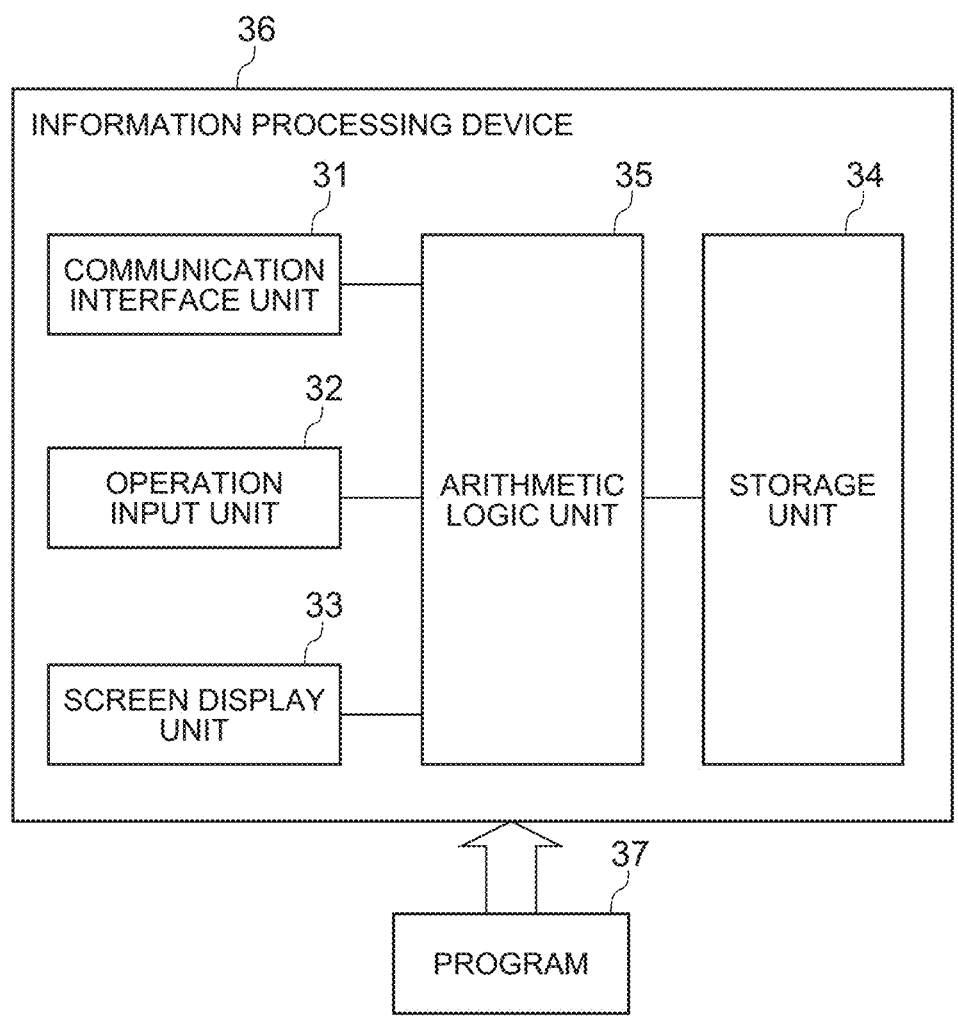
FIG. 8 is a block diagram showing an example of a hardware configuration of the control unit of the tablet printing device according to the first example embodiment of the present invention.

FIG. 7 is a block diagram of the control unit 8. Referring to FIG. 7, the control unit 8 includes a printing control unit 21, a faulty item detection unit 22, and a registration data acquisition unit 23. The control unit 8 can be realized by an information processing device 36 such as a personal computer and a program 37. The information processing device has a communication interface unit 31, an operation input unit 32 such as a keyboard and a mouse, a screen display unit 33 such as a liquid crystal display, a storage unit 34 such as a memory and a hard disk, and an arithmetic logic unit 35 such as one or more microprocessors, for example, as shown in FIG. 8. The program 37 is loaded from an external computer-readable storage medium into the storage unit 34 at the time of startup of the information processing device 36, and controls the operation of the arithmetic logic unit 35 to realize the printing control unit 21, the faulty item detection unit 22 and the registration data acquisition unit 23 on the arithmetic logic unit 35.

The printing control unit 21 detects the position and posture of the tablet 1, and so on, from an image captured by the detection camera 4, calculates a timing to output a printing instruction to the inkjet printer 5 based on information such as the detected position of the tablet 1, the conveyance speed of the belt conveyor 3 and the printing speed of the inkjet printer 5, and transmits the printing instruction to the inkjet printer 5 at the calculated timing.

The faulty item detection unit 22 determines whether or not the tablet 1 has a failure such as printing misalignment or faint printing in the characters printed on the tablet 1 and whether or not the tablet 1 has a defect such as chip from an image including the tablet 1 after printing captured by the registration camera 6. In the case of determining that the tablet 1 has a printing failure or a defect, the faulty item detection unit 22 controls the faulty item discharge unit 12 to discharge the tablet 1 from the belt conveyor 3. Moreover, the faulty item detection unit 22 notifies the registration data acquisition unit 23 of identification information of the image including the tablet 1 determined to be a faulty item (for example, the frame number, the capture time and so on of the image).

The registration data acquisition unit 23 acquires an area of the image data 14 printed on the tablet 1 as a registration partial image from an image including the tablet 1 after printing captured by the registration camera 6. Moreover, the registration data acquisition unit 23 acquires outline data of the tablet 1 as registration outline data from the image including the tablet 1 after printing captured by the registration camera 6. Moreover, the registration data acquisition unit 23 pairs the two types of registration data, that is, the acquired registration partial image and the acquired registration outline data, and registers them into the database 7. The registration data acquisition unit 23 does not acquire the abovementioned registration data from an image including the tablet 1 determined to be a faulty item by the faulty item discharge unit 12.

Figure 9:
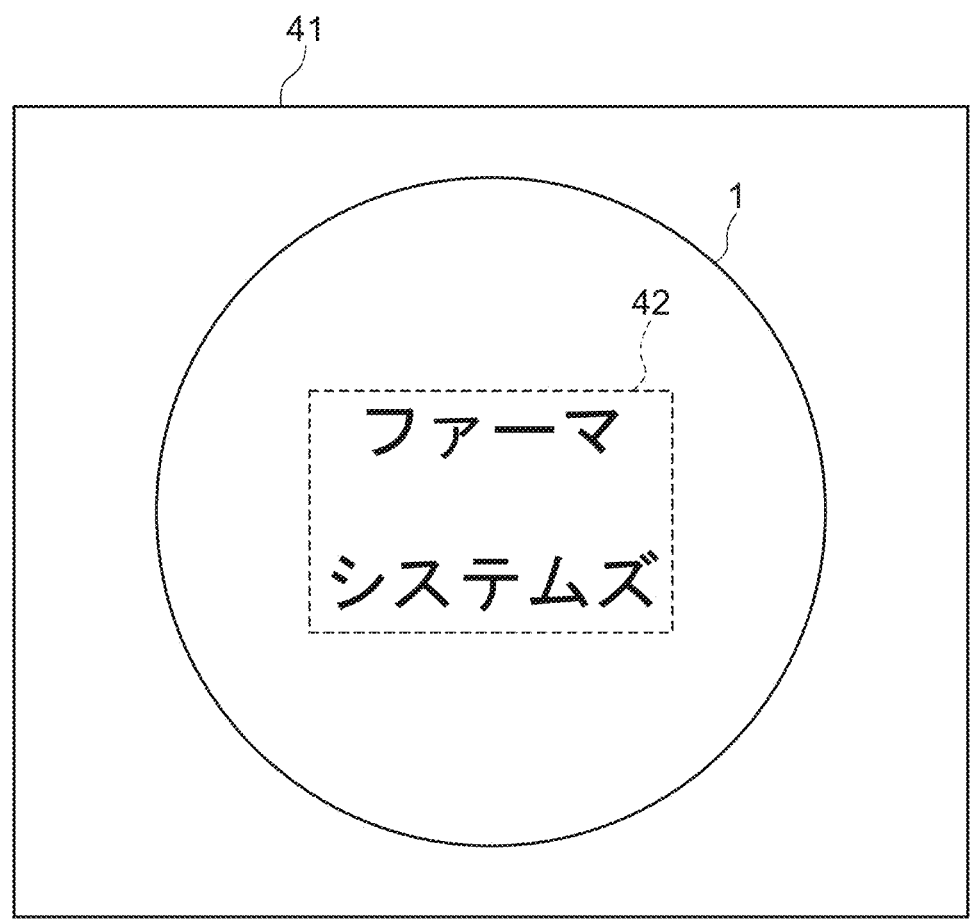
FIG. 9 is a view showing an example of an image including a tablet after printing and a registration partial image acquired from the image in the first example embodiment of the present invention.

FIG. 9 shows an example of an image 41 including the tablet 1 after printing captured by the registration camera 6 and a registration partial image 42 acquired from the image. In the example shown by FIG. 9, the registration data acquisition unit 23 acquires a circumscribed rectangle including all the characters existing in the image of the tablet 1 as the registration partial image 42. In the acquisition of the registration partial image 42, the registration data acquisition unit 23 recognizes the characters from the image of the tablet 1 by a method such as pattern matching, generates a circumscribed rectangle including all the recognized characters, and acquires an image region within the circumscribed rectangle as the registration partial image 42. Alternatively, in a case where the image data 14 used as printing data has its outline, the registration data acquisition unit 23 recognizes the outline from the image of the tablet 1 by a method such as pattern matching, and acquires an image region within the recognized outline as the registration partial image 42. The acquired registration partial image 42 includes both a printed site with ink and a non-printed site with the tablet surface exposed.

Figure 10A:
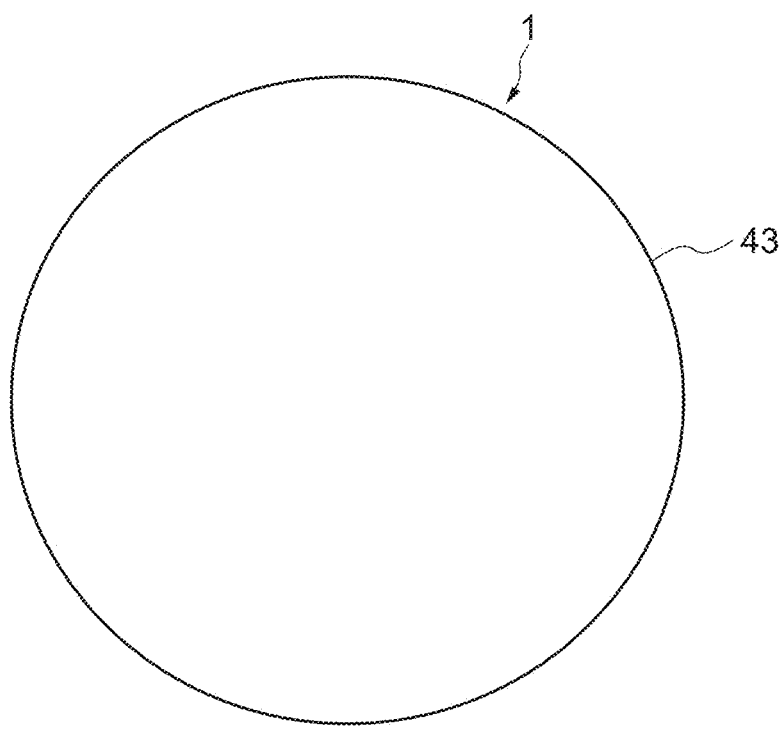
FIG. 10A is a view showing an example of tablet outline data acquired from the image including the tablet after printing in the first example embodiment of the present invention.
Figure 10B:
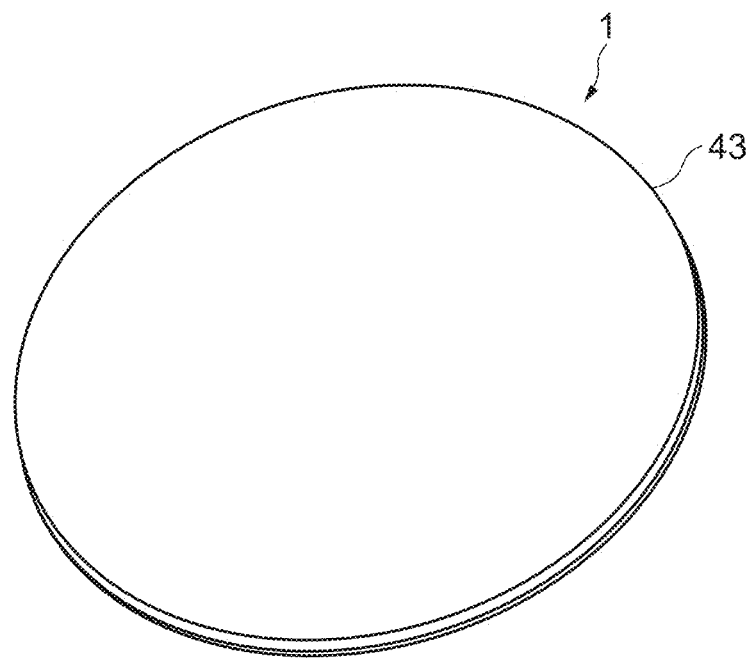
FIG. 10B is a view showing another example of the tablet outline data acquired from the image including the tablet after printing in the first example embodiment of the present invention.

FIG. 10A shows an example of outline data 43 of the tablet 1 acquired from an image including the tablet 1 after printing captured by the registration camera 6. The outline data 43 is an example of the outline data of the tablet 1 on which printing is performed in a posture facing the print head. FIG. 10B shows another example of the outline data 43 of the tablet 1 obtained from the image. The outline data 43 shown in FIG. 10B is an example of the outline data of the tablet 1 on which printing is performed in an inclined orientation without facing the print head. In the case of the tablet 1 on which printing is performed in the inclined orientation, not only the outline of the curved face portion 1a but also part of the outline of the side face portion 1c and the lower curved face portion 1b that do not appear in FIG. 10A is acquired. The outline data 43 may be, for example, a binary image in which the outline portion has a value of 1 and the other portion has a value of 0. Alternatively, the outline data 43 may be data in which the outline is approximated by a large number of line segments as faithfully as possible and which is composed of a set of apex coordinates that are the connection points of the line segments. Moreover, the registration data acquisition unit 23 may be configured to acquire, as the outline data of the tablet 1, in addition to the outline data of the shape of the tablet 1 as shown in FIGS. 10A and 10B, the outline data of the characters printed on the tablet 1 by the inkjet printer 5. Moreover, the registration data acquisition unit 23 may be configured to, in a case where a certain standard pattern is applied to the surface of the tablet 1 before printing by the inkjet printer 5, acquire the outline data of the standard pattern in addition to the outline data of the shape of the tablet 1. Examples of the standard pattern include a character, a figure, a symbol, a design drawing, a barcode, and so on. A capsule tablet with the upper part and the lower part painted in different colors is an example. Thus, the standard pattern applied to the tablet 1 appears in different manners depending on the posture of the tablet 1 even if the standard pattern is applied to the same place on the tablet 1, so that the standard pattern can be used as the data for determining the identity as with the outline data of the shape of the tablet 1. By using not only the outline data of the shape of the tablet 1 but also using the standard pattern, more accurate authenticity determination or pruning in matching becomes possible. Meanwhile, it is needless to say that an aspect that does not utilize such a standard pattern is also included in the present invention.

FIG. 11 shows an example of registration information of the database 7. Referring to FIG. 11, pairs of registration partial images 45-1 to 45-n and registration outline data 46-1 to 46-n are registered in the database 7.

Figure 12:
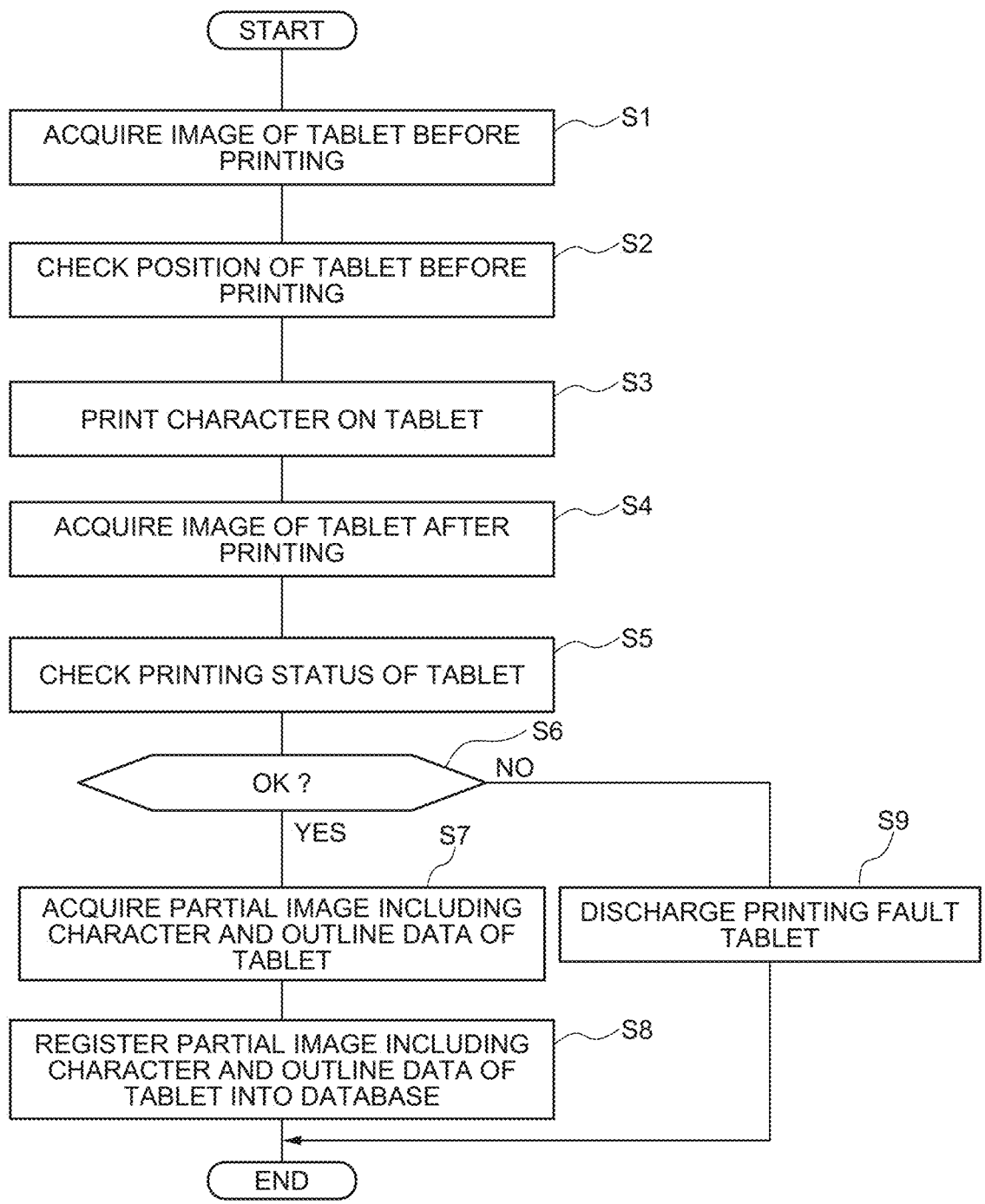
FIG. 12 is a flowchart showing an example of processing by the control unit in the table printing device according to the first example embodiment of the present invention.

FIG. 12 is a flowchart showing an example of processing by the control unit 8. When the tablet 1 supplied by the hopper 2 is conveyed on the belt conveyor 3 and passed directly below the detection camera 4, an image of the tablet 1 is captured by the detection camera 4. The printing control unit 21 of the control unit 8 acquires the captured image from the detection camera 4 (step S1), and analyzes the image to check the position of the tablet 1 (step S2). Next, the printing control unit 21 controls the inkjet printer 5 to print a reference character pattern at a timing when the tablet 1 passes directly below the print head of the inkjet printer 5 (step S3).

Next, when the tablet 1 with the printing process performed passes directly below the registration camera 6, an image of the tablet 1 after the printing process is captured by the registration camera 6. The faulty item detection unit 22 and the registration data acquisition unit 23 of the control unit 8 acquire the captured image from the registration camera 6 (step S4). Next, the faulty item detection unit 22 determines whether printing is faulty or not from the acquired image (step S5) and, if faulty (step S6, NO), causes the faulty item discharge unit 12 to discharge the tablet 1 into the faulty item storage box 13 (step S9). On the other hand, if not faulty, the registration data acquisition unit 23 acquires a registration partial image and registration outline data from the image acquired from the registration camera 6 (step S7). Next, the registration data acquisition unit 23 associates the acquired registration partial image with the acquired registration outline data and registers them into the database 7 (step S8).

Next, an effect of this example embodiment will be described.

A first effect is that the accuracy of matching for determining the identity of a tablet can be increased. The reason is that a random pattern of a printed site printed with ink by inkjet printing on the tablet can be captured more reproducibly and more clearly than a random pattern caused by the unevenness of the tablet surface.

A second effect is that the identity of a tablet can be determined based on not only a partial image including a character but also the posture of the tablet at the time of printing because, in addition to a registration partial image that is the partial image including the character, registration outline data representing the posture of the tablet is acquired as data for determining the identity of the tablet.

Second Example Embodiment

Next, a tablet matching device according to a second example embodiment of the present invention will be described. The tablet matching device according to this example embodiment is, for example, a device for determining whether a tablet obtained on the market is genuine (an authentic tablet) or fake.

Figure 13:
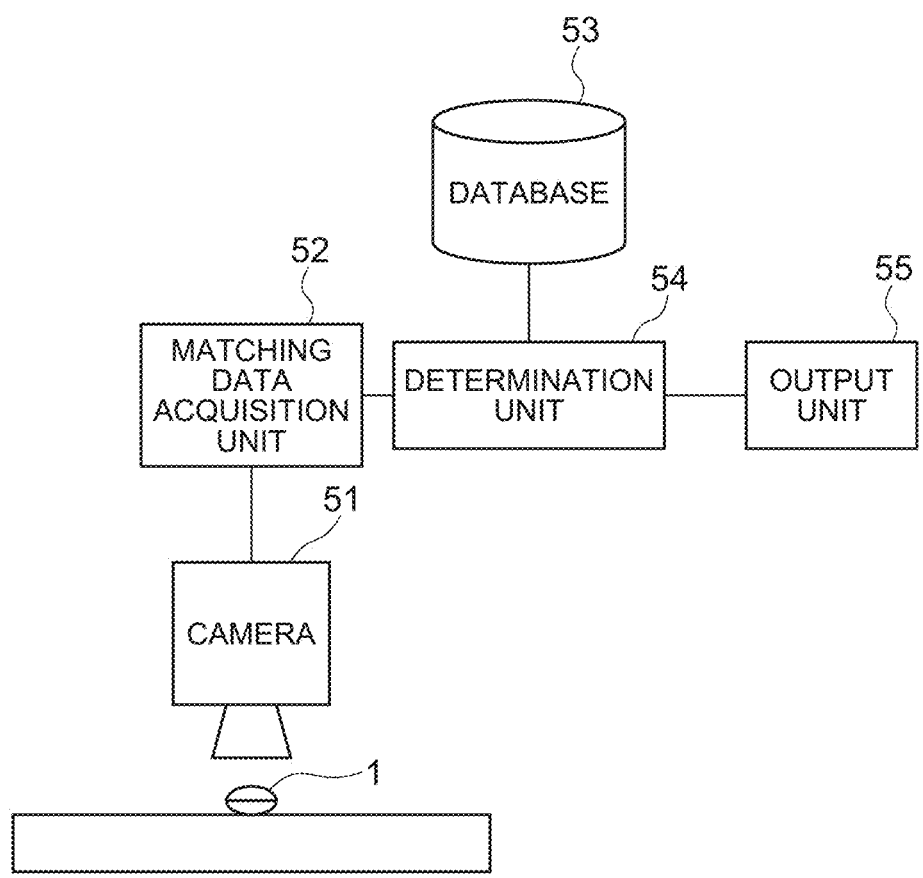
FIG. 13 is a configuration view of a tablet matching device according to a second example embodiment of the present invention.
Figure 14:
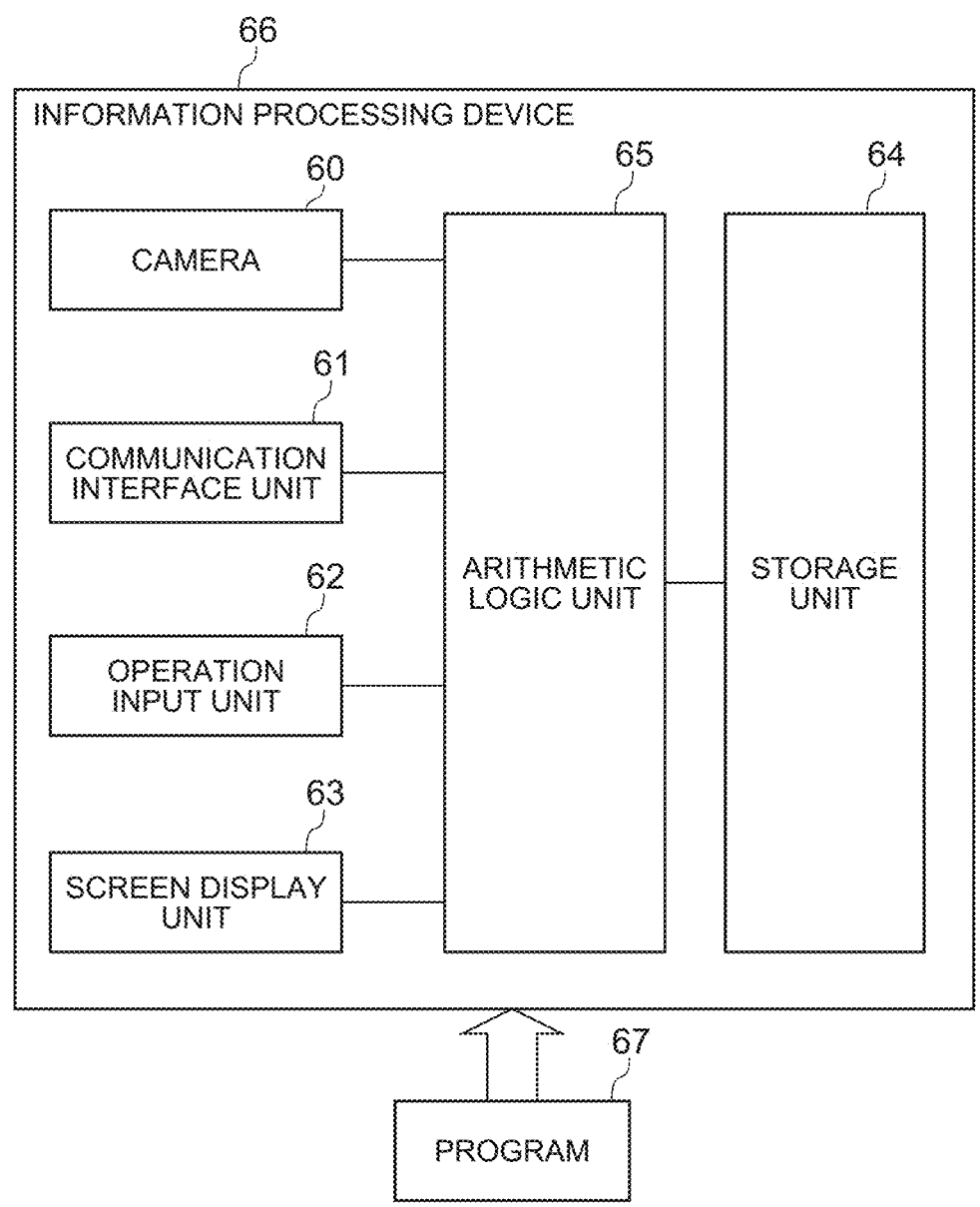
FIG. 14 is a view showing an example of a hardware configuration of the tablet matching device according to the second example embodiment of the present invention.

FIG. 13 is a configuration view of the tablet matching device according to this example embodiment. Referring to FIG. 13, the tablet matching device according to this example embodiment includes a camera 51, a matching data acquisition unit 52, a database 53, a determination unit 54, and an output unit 55. The tablet matching device can be realized by an information processing device 66 such as a personal computer or a smartphone and a program 67. The information processing device 66 has a camera 60, a communication interface unit 61, an operation input unit 62 such as a keyboard and a mouse, a screen display unit 63 such as a liquid crystal display, a storage unit 64 such as a memory and a hard disk, and an arithmetic logic unit 65 such as one or more microprocessors. The program 67 is loaded from an external computer-readable storage medium into the storage unit 64 at the time of startup of the information processing device 66, or the like, and controls the operation of the arithmetic logic unit 65 to realize the matching data acquisition unit 52, the database 53, the determination unit 54 and the output unit 55 on the arithmetic logic unit 65.

The camera 51 is an image capturing unit that captures an image of the tablet 1 that is the target for authenticity determination. A user who performs authenticity determination using the tablet matching device places the tablet 1 that is the target for authenticity determination on a table or the like with the curved face portion 1a on which a character is printed facing up, and captures an image of the whole tablet 1 by the camera 51.

The matching data acquisition unit 52 is configured to acquire a partial image of predetermined size including a character as a matching partial image from an image including the tablet 1 captured by the camera 51. Moreover, the matching data acquisition unit 52 is configured to acquire the outline data of the tablet 1 as matching outline data from the abovementioned image.

In the database 53, one or more pairs of two types of registration data as with the database 7 included in the tablet printing device shown in FIG. 1, that is, one or more pairs of registration partial images and registration outline data are stored beforehand. Moreover, in the database 53, a three-dimensional model of the tablet 1 to be matched is stored beforehand. A method of representing the three-dimensional model is optional; for example, surface modeling or solid modeling may be used. In the case of using the outline data of a standard pattern applied to the surface of the tablet 1 in addition to the outline data of the shape of the tablet 1, the three-dimensional model of the tablet 1 to be matched is configured to include data of the standard pattern applied to the surface of the tablet 1.

The determination unit 54 is configured to compare the matching partial image and matching outline data acquired by the matching data acquisition unit 52 with the registration partial image and registration outline data stored in the database 53, and determine whether the tablet 1 is an officially produced genuine tablet (an authentic tablet) or a fake.

The output unit 55 is configured to display the result of determination by the determination unit 54 on the screen display unit 63, or transmit to an external terminal through the communication interface unit 61.

Figure 15:
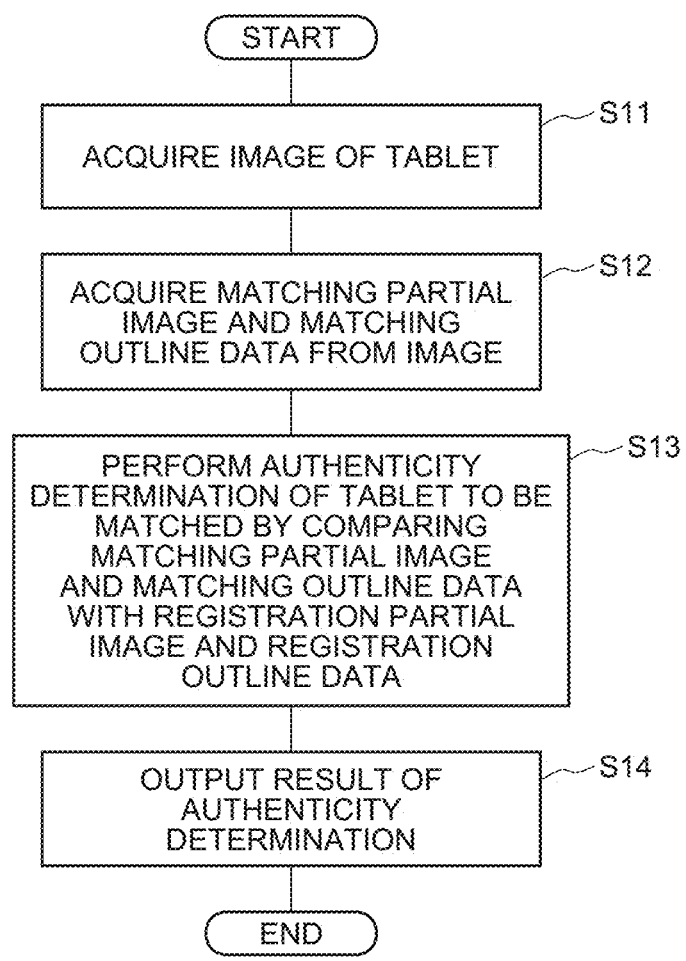
FIG. 15 is a flowchart showing an example of processing by the tablet matching device according to the second example embodiment of the present invention.

FIG. 15 is a flowchart showing an example of processing by the tablet matching device according to this example embodiment. Referring to FIG. 15, first, the camera 51 captures an image including the tablet 1 in accordance with camera operation by the user (step S11). Next, the matching data acquisition unit 52 acquires two kinds of matching data including a matching partial image and matching outline data from the image including the tablet 1 captured by the camera 51 (step S12). Next, the determination unit 54 compares the matching partial image and matching outline data acquired by the matching data acquisition unit 52 with the registration partial image and registration outline data stored beforehand in the database 53, and determines the authenticity of the tablet 1 (step S13). Next, the output unit 55 outputs the result of determination by the determination unit 54 (step S14).

Subsequently, the processing by the matching data acquisition unit 52 and the determination unit 54 will be described in detail.

First, the processing by the matching data acquisition unit 52 will be described in detail.

Figure 16:
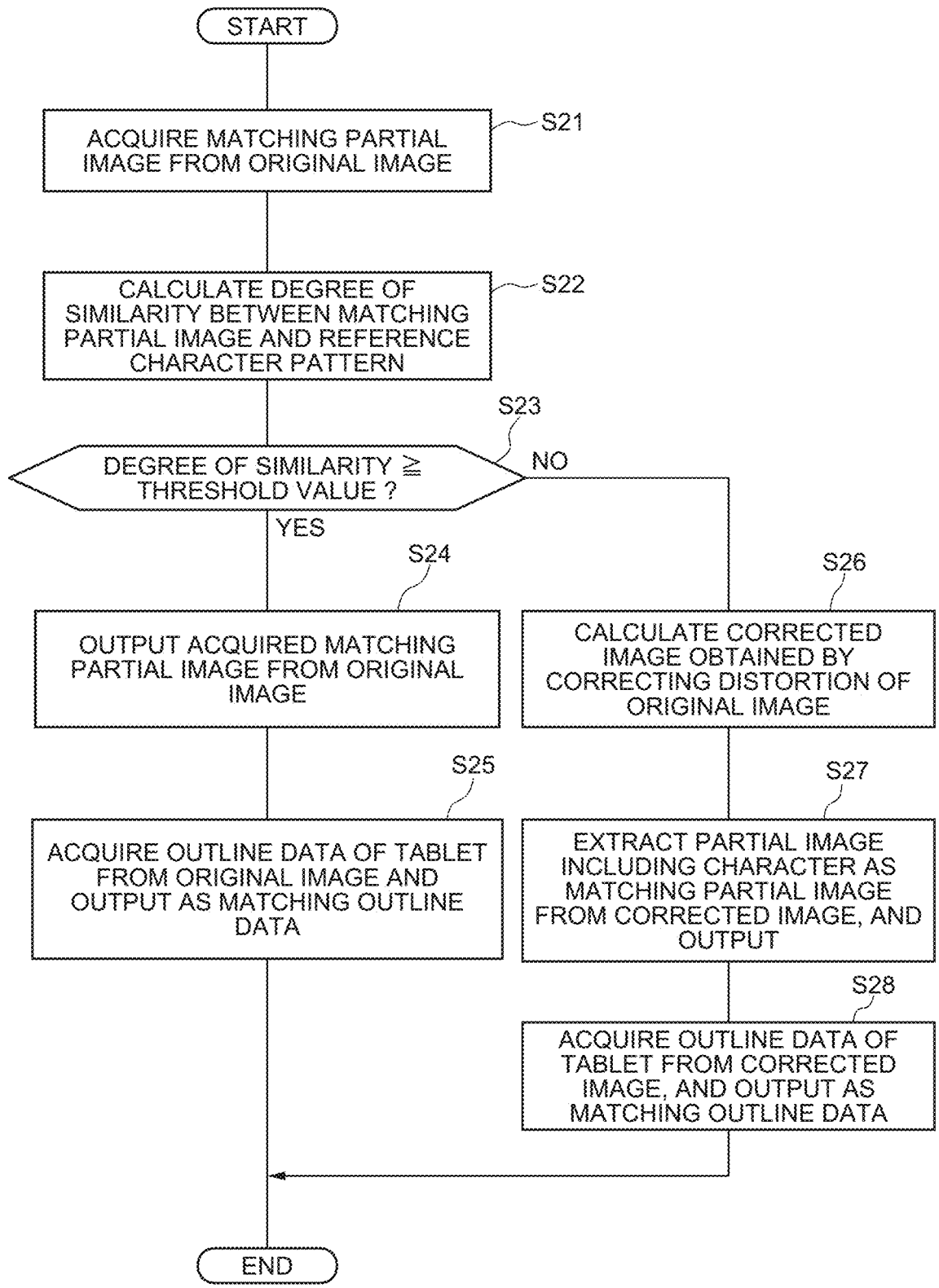
FIG. 16 is a flowchart showing an example of processing by a matching data acquisition unit in the tablet matching device according to the second example embodiment of the present invention.

FIG. 16 is a flowchart showing an example of the processing by the matching data acquisition unit 52. Referring to FIG. 16, the matching data acquisition unit 52 sets an image of the tablet 1 captured by the camera 51 as an original image and extracts a matching partial image from the original image (step S21). A method of extracting the matching partial image is the same as the method by which the registration data acquisition unit 23 of the tablet printing device extracts a registration partial image from an image.

Next, the matching data acquisition unit 52 compares the horizontal and vertical sizes of the matching partial image extracted from the original image and the shape and size of a character therein with the horizontal and vertical sizes of the image data 14 that is a reference character pattern and the shape and size of a character therein, and thereby calculates the degree of similarity between the matching partial image and the reference character pattern (step S22). A method of obtaining the degree of similarity is optional. For example, the matching data acquisition unit 52 may obtain the maximum value of the correlation value between the matching partial image extracted from the original image and the reference character pattern as the degree of similarity. The reference character pattern used by the matching data acquisition unit 52 is the same as the image data 14 used as printing data by the inkjet printer 5 of the tablet printing device. In a case where the posture of the tablet 1 when the tablet 1 is captured by the camera 51 is identical to the posture of the tablet 1 when the character is printed on the tablet 1, the matching partial image matches the reference character pattern. However, in a case where the posture of the tablet 1 when the tablet 1 is captured by the camera 51 is different from the posture of the tablet 1 when the character is printed on the tablet 1, the matching partial image is distorted with respect to the reference character pattern. For example, when the printed site 15 of FIG. 4A is observed from a direction not facing the tablet 1, it looks like a pattern of W' that is shorter than W.

Next, the matching data acquisition unit 52 compares the degree of similarity with a threshold value (step S23). In a case where the degree of similarity is equal to or more than the threshold value (step S23, YES), the matching data acquisition unit 52 outputs the matching partial image extracted at step S21 to the determination unit 54 (step S24). Moreover, the matching data acquisition unit 52 extracts the outline data of the tablet 1 from the original image, and outputs the extracted outline data as matching outline data to the determination unit 54 (step S25). A method of extracting the matching outline data is the same as the method by which the registration data acquisition unit 23 of the tablet printing device extracts the registration outline data from the image.

On the other hand, in a case where the degree of similarity is less than the threshold value (step S23, NO), the matching data acquisition unit 52 performs the following processing.

First, the matching data acquisition unit 52 creates an image obtained with the camera 51 capturing the tablet 1 having the same posture as the posture of the tablet 1 when the character is printed, from the original image by image processing (step S26). The created image is referred to as a corrected image. The details of the method for creating the corrected image will be described later.

Next, the matching data acquisition unit 52 acquires a matching partial image from the corrected image by the same method as at step S21, and outputs the acquired matching partial image to the determination unit 54 (step S27). Next, the matching data acquisition unit 52 acquires the outline data of the tablet 1 from the corrected image, and outputs the acquired outline data as matching outline data to the determination unit 54 (step S28).

Next, the details of the method of creating the corrected image from the original image will be described.

Figure 17:
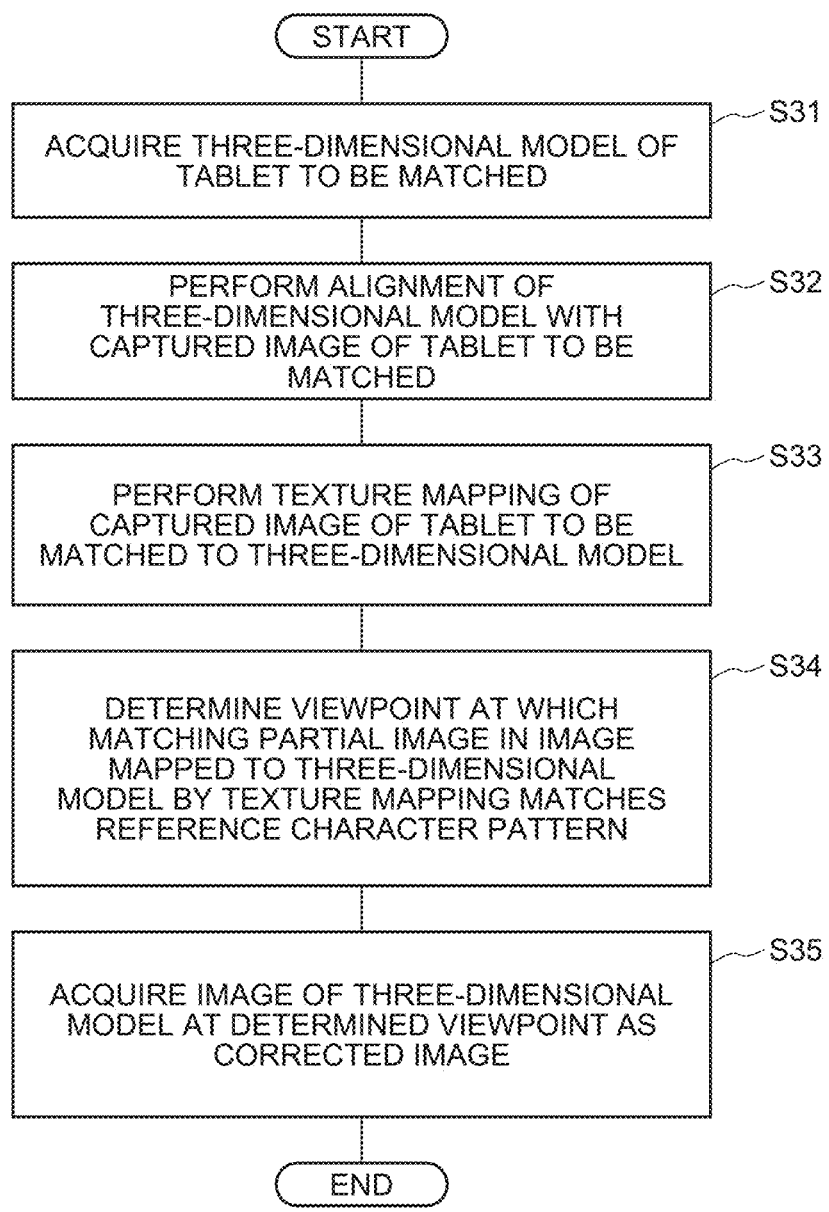
FIG. 17 is a flowchart showing an example of a method by which the matching data acquisition unit creates a corrected image in the tablet matching device according to the second example embodiment of the present invention.

FIG. 17 is a flowchart showing an example of the method of creating the corrected image. Referring to FIG. 17, the matching data acquisition unit 52 first acquires a three-dimensional model of the tablet 1 to be matched from the database 53 (step S31). Next, the matching data acquisition unit 52 performs alignment of the three-dimensional model with an image of the tablet 1 in the original image (step S32). The alignment referred to herein is to match the position and angle of view of a virtual camera that captures the three-dimensional model with the position and angle of view of the camera 51 that has captured the original image. That is to say, it is to determine the position and angle of view of a virtual camera that can capture an image in the same manner as the image of the tablet 1 in the original image. Since the position and so on of the camera 51 are unknown, the matching data acquisition unit 52 performs a process of matching between the three-dimensional model and the image of the tablet 1 in the original image while changing the position and angle of view of the virtual camera, and thereby aligns the three-dimensional model with the image of the tablet 1 in the original image.

Next, the matching data acquisition unit 52 maps the image of the tablet in the original image to the aligned three-dimensional model by texture mapping (step S33). That is to say, the matching data acquisition unit 52 maps the image of the tablet to the surface polygon of the aligned three-dimensional model.

Next, the matching data acquisition unit 52 determines a viewpoint at which the matching partial image including the character mapped to the three-dimensional model by texture-mapping matches the reference character pattern, that is, the position of the virtual camera (step S34). Next, the matching data acquisition unit 52 acquires an image of the three-dimensional model at the determined viewpoint, that is, an image obtained by capturing the three-dimensional model from the determined viewpoint as a corrected image (step S35).

Figure 18:
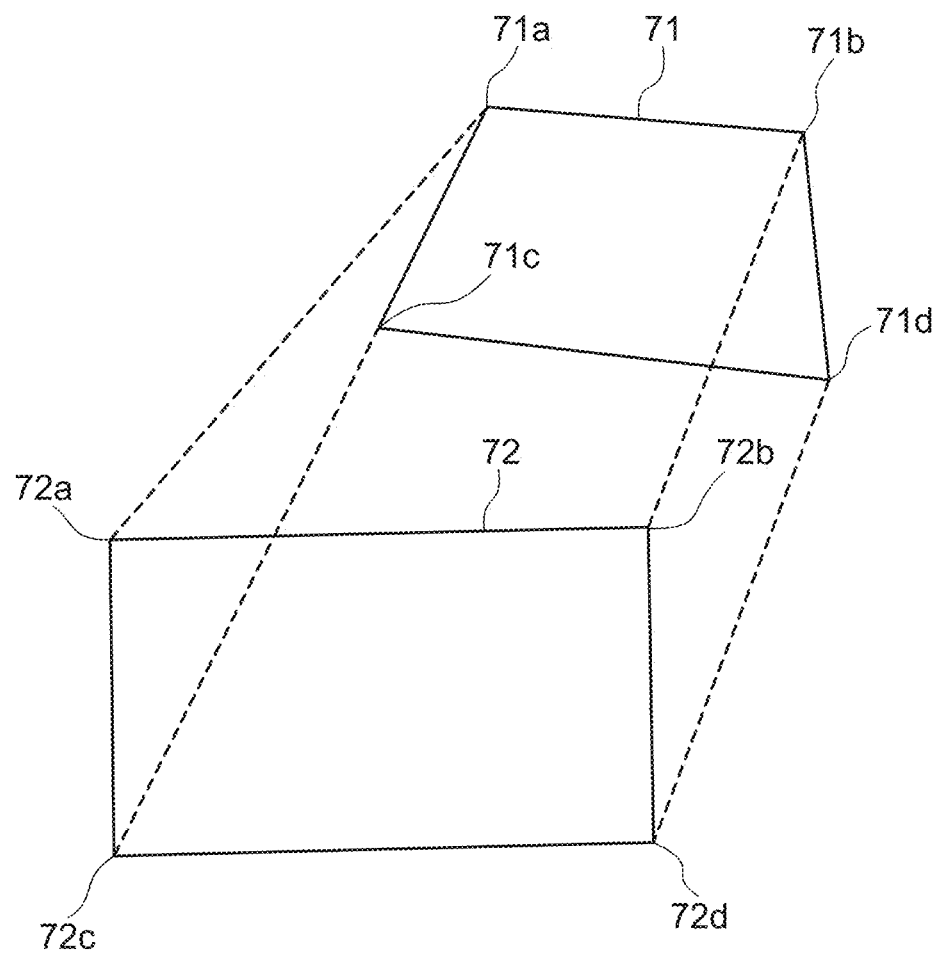
FIG. 18 is an explanatory view of another method by which the matching data acquisition unit creates a corrected image in the tablet matching device according to the second example embodiment of the present invention.

FIG. 18 is an explanatory view of another method for correcting the distortion of a matching partial image extracted from an original image. In FIG. 18, an image 71 is a matching partial image extracted from an original image, and an image 72 is the image data 14 that is printing data. The matching data acquisition unit 52 detects vertices 71a, 71b, 71c, 71d of the image 71 and associates them with vertices 72a, 72b, 72c, 72d of the image 72, respectively. Next, the matching data acquisition unit 52 corrects the distortion of the image 71 so that the image 71 becomes a rectangle having the same size and aspect ratio as the image 72. The matching data acquisition unit 52 can be realized by using software such as Photoshop (registered trademark) having a distortion correction function.

Next, the details of the determination unit 54 will be described.

Figure 19:
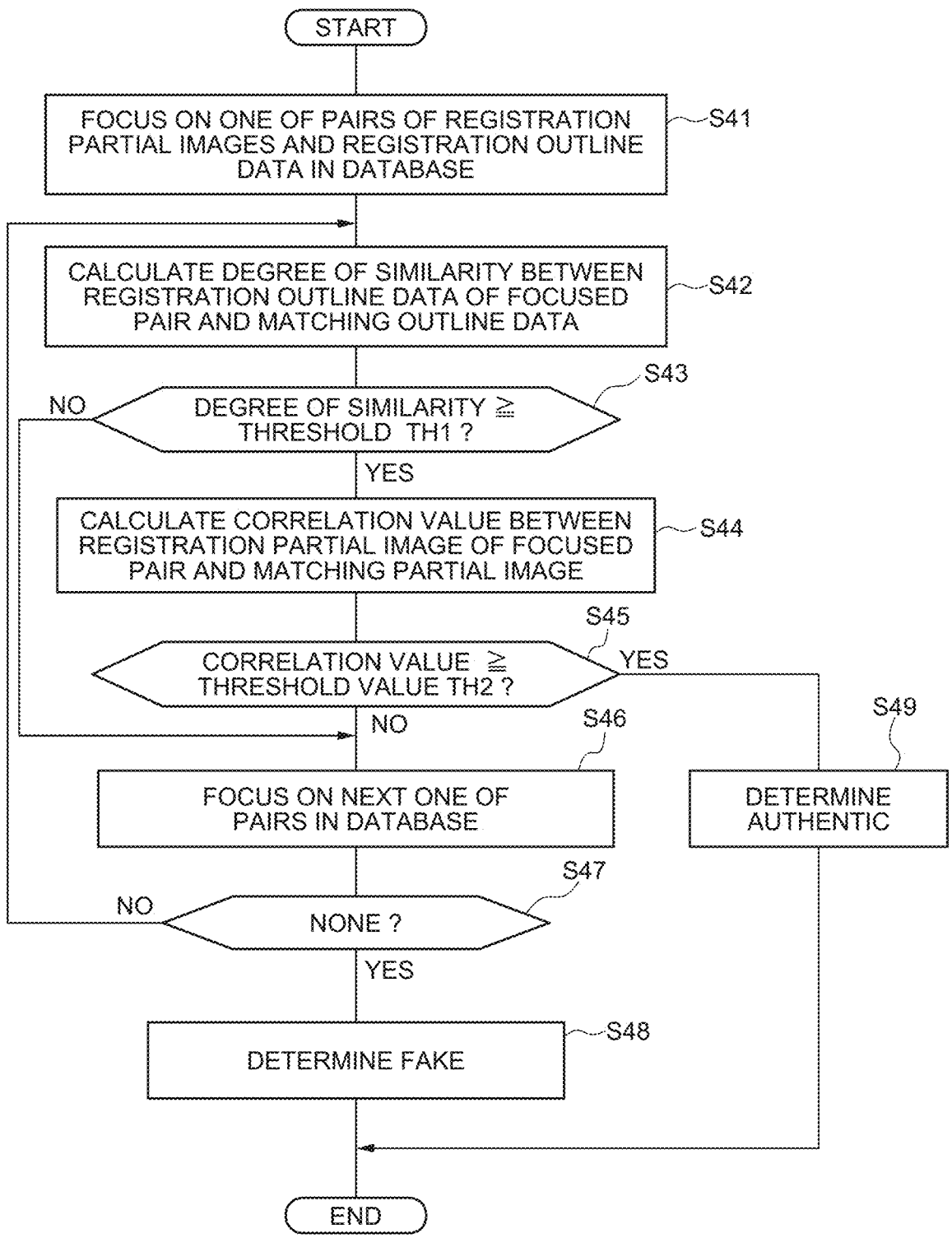
FIG. 19 is a flowchart showing an example of processing by a determination unit in the tablet matching device according to the second example embodiment of the present invention.

FIG. 19 is a flowchart showing an example of processing by the determination unit 54. Referring to FIG. 19, the determination unit 54 focuses on one of the pairs of registration partial images and registration outline data stored in the database 53 (step S41). Next, the determination unit 54 calculates the degree of similarity between the registration outline data of the focused pair and the matching outline data (step S42). The degree of similarity between the tablet outline data can be calculated with a smaller amount of calculation by pattern matching of binarized outline data or comparison calculation of feature values extracted from the binarized outline data than by correlation processing between the matching partial image and the registration partial image. The degree of similarity is a larger value as the outline data are similar to each other, and is smaller as the outline data are not similar to each other.

Next, the determination unit 54 compares the degree of similarity with a preset threshold value TH1 (step S43). In a case where the degree of similarity is less than the threshold value TH1, the determination unit 54 skips a process of comparison with the registration partial image of the focused pair (steps S44, S45), and proceeds to step S46. Meanwhile, in a case where the degree of similarity is equal to or more than the threshold value TH1, the determination unit 54 calculates a correlation value between the registration partial image of the focused pair and the matching partial image by using phase-only correlation or the like (step S44). The correlation value is a value close to 1 in a case where the registration partial image and the matching partial image are acquired from the same tablet 1. Next, the determination unit 54 compares the correlation value with a preset threshold value TH2 (step S45). In a case where the correlation value is equal to or more than the threshold value TH2, the determination unit 54 determines that the tablet 1 is an authentic tablet (step S49). Then, the determination unit 54 ends the processing of FIG. 19. Meanwhile, in a case where the correlation value is less than the threshold value TH2, the determination unit 54 proceeds to step S46.

The determination unit 54 focuses on the next one of the pairs of registration partial images and registration outline data stored in the database 53. Then, the determination unit 54 returns to step S42 and repeats the same processing as the abovementioned processing. When the determination unit 54 finishes focusing on all the pairs in the database 53 (step S47, YES), the determination unit 54 determines that the tablet 1 is a fake tablet (step S48). Then, the determination unit 54 ends the processing of FIG. 19.

Figure 20:
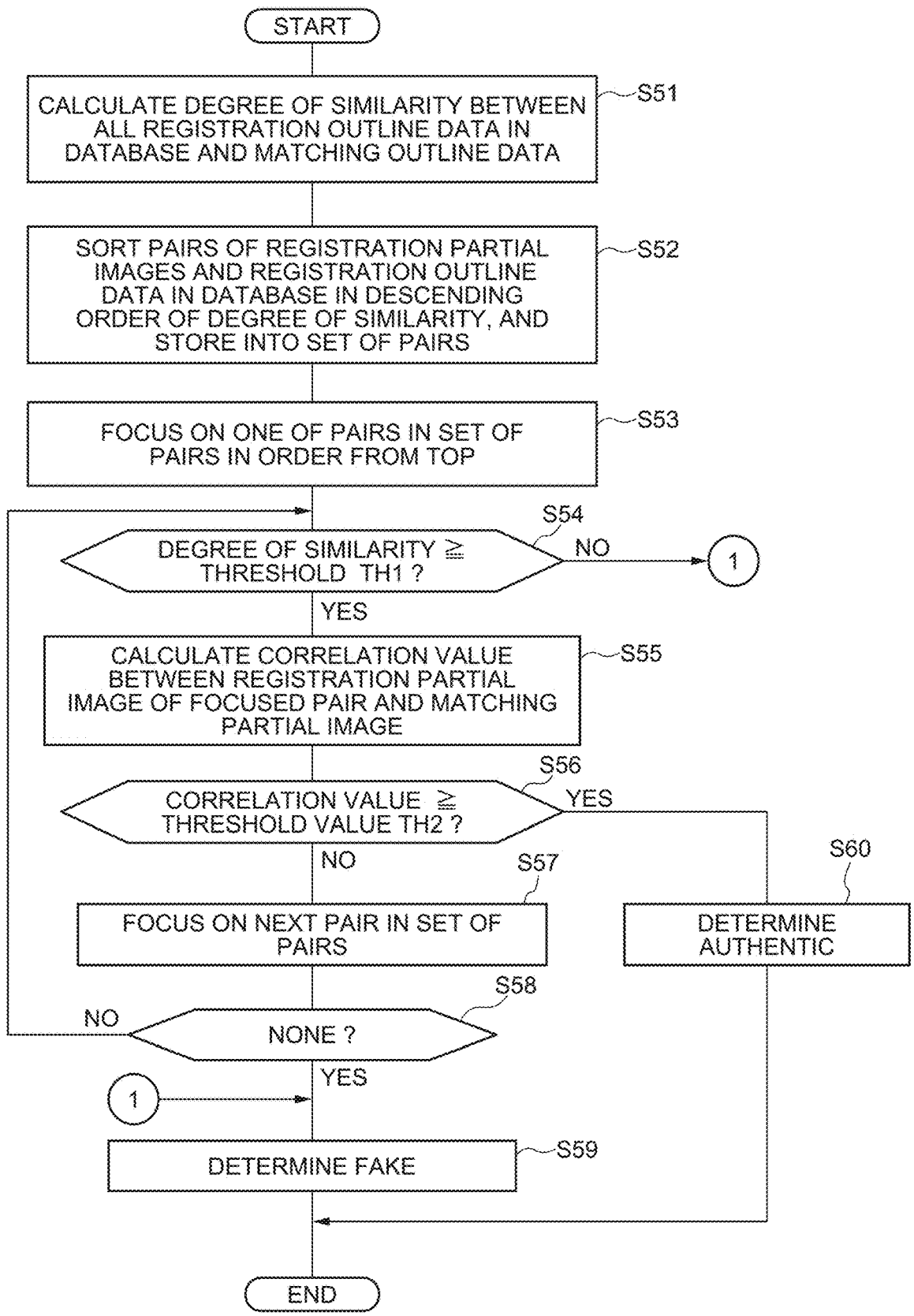
FIG. 20 is a flowchart showing another example of processing by the determination unit in the tablet matching device according to the second example embodiment of the present invention.

FIG. 20 is a flowchart showing another example of the processing by the determination unit 54. Referring to FIG. 20, the determination unit 54 calculates the degree of similarity between all the registration outline data stored in the database 53 and the matching outline data (step S51). Next, the determination unit 54 sorts the pairs of registration partial images and registration outline data in the database 53 in descending order of the degree of similarity between the registration outline data and the matching outline data, and stores the sorted pairs into a set of pairs (step S52).

Next, the determination unit 54 focuses on a pair having the highest degree of similarity in the set of pairs (step S53), and compares its degree of similarity with a preset threshold value TH1 (step S54). In a case where the degree of similarity is less than the threshold value TH1, the determination unit 54 determines that the tablet 1 is a fake tablet (step S59). Then, the determination unit 54 ends the processing of FIG. 20. On the other hand, in a case where the degree of similarity is equal to or more than the threshold value TH1, the determination unit 54 calculates the correlation value between the registration partial image of the focused pair and the matching partial image by using phase-only correlation or the like (step S55). Next, the determination unit 54 compares the correlation value with a preset threshold value TH2 (step S56). In a case where the correlation value TH2 is equal to or more than the threshold value TH2, the determination unit 54 determines that the tablet 1 is an authentic tablet (step S60). Then, the determination unit 54 ends the processing of FIG. 20. In a case where the correlation value is less than the threshold value TH 2, the determination unit 54 focuses on a pair having the second highest degree of similarity in the set of pairs (step S57). Then, the determination unit 54 returns to step S54 and repeats the same processing as the abovementioned processing. When the determination unit 54 finishes focusing on all the pairs in the set of pairs (step S58, YES), the determination unit 54 determines that the tablet 1 is a fake tablet (step S59). Then, the determination unit 54 ends the processing of FIG. 20.

Next, an effect of this example embodiment will be described.

A first effect is that a tablet matching device with high matching accuracy can be obtained. The reason is that the identity of a tablet to be matched is determined by extracting a matching partial image including a character from an image obtained by capturing the tablet to be matched with the character printed thereon and comparing the matching partial image with a registration partial image acquired from an authentic tablet and registered in advance.

A second effect is that even an ordinary person who does not have a special lighting device can easily capture a clear random pattern and perform authenticity determination by using a camera such as a smartphone camera. The reason is that a clear random pattern can be easily obtained from an image of a tablet to be matched with a character printed thereon.

A third effect is that fast authenticity determination can be performed. The reason is that pruning in tablet matching is performed by using outline data representing the posture of a tablet at the time of printing a character. That is to say, the determination unit 54 of the tablet matching device calculates the degree of similarity between the matching outline data of the tablet 1 and the registration outline data acquired from an authentic tablet and registered in advance and compares the degree of similarity with a threshold value, thereby determining the necessity of correlation calculation between the matching partial image including the character of the tablet 1 and the registration partial image and reducing the number of times of performing the correlation calculation that requires a large amount of calculation.

A fourth effect is that it is possible to perform a robust authenticity determination against the difference between an imaging direction at the time of registration and an imaging direction at the time of matching. One of the reasons is that a random pattern caused by the shadow of the peripheral edge of a tablet in the related technique of the present invention relatively easily varies even if the direction of illumination (illumination direction) is slightly deviated and a random pattern obtained thereby also varies accordingly. Moreover, in the first place, the lens aperture of a mobile phone camera or the like is small and the sensitivity of lightness and darkness is poor, so that it is usually impossible to stably capture the density of thin shadow without applying strong illumination. Therefore, even if the same tablet is used, when there is a difference in illumination direction or lighting equipment between at the time of registration and at the time of matching, a random pattern obtained thereby differs and the accuracy of matching lowers. On the other hand, a random pattern obtained from an image obtained by capturing a tablet to be matched with a character printed thereon is brightness and darkness caused by the presence and absence of dark-color ink, and is originally clearly obtained. Therefore, the random pattern does not vary much even if the imaging direction is slightly different between at the time of registration and at the time of matching. Another one of the reasons is that the matching data acquisition unit 52 of the tablet matching device calculates a corrected image obtained by correcting the distortion of an original image and acquires a matching partial image from the corrected image.

Third Example Embodiment

Figure 21:
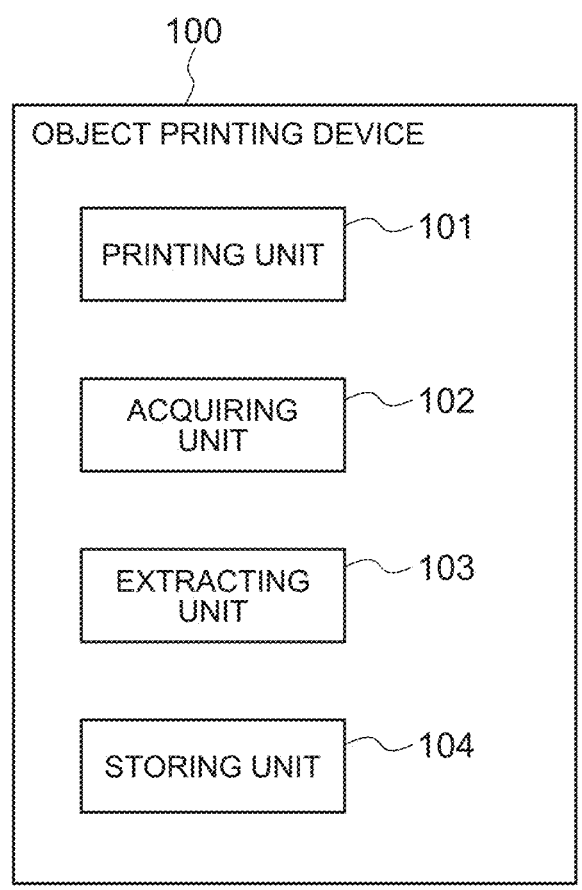
FIG. 21 is a block diagram of an object printing device according to a third example embodiment of the present invention.

Next, an object printing device according to a third example embodiment of the present invention will be described. FIG. 21 is a block diagram of the object printing device according to this example embodiment.

Referring to FIG. 21, an object printing device 100 according to this example embodiment includes a printing unit 101, an acquiring unit 102, an extracting unit 103, and a storing unit 104.

The printing unit 101 is configured to print a character on an object to be registered. The object may be, for example, a tablet, and may be an object other than a tablet, for example, a confection, a semiconductor component, a mechanical component, and a product package. The printing unit 101 can be configured by, for example, an inkjet printer, but is not limited thereto. The acquiring unit 102 is configured to acquire an image of an object with a character printed thereon captured by the printing unit 101. The acquiring unit 102 can be configured by, for example, a camera, but is not limited thereto. The extracting unit 103 is configured to extract a registration partial image including the abovementioned character from the image acquired by the acquiring unit 102. The extracting unit 103 can be configured, for example, in the same manner as the registration data acquisition unit 23 of the object printing device according to the first example embodiment, but is not limited thereto. The storing unit 104 is configured so that the registration partial image extracted by the extracting unit 103 is stored therein as data for determining the identity of the object to be registered.

The object printing device 100 thus configured operates in the following manner. First, the printing unit 101 prints a character on an object to be registered. Next, the acquiring unit 102 acquires an image of the object with the character printed thereon captured by the printing unit 101. Next, the extracting unit 103 extracts a registration partial image including the abovementioned character from the image acquired by the acquiring unit 102. Next, in the storing unit 104, the registration partial image extracted by the extracting unit 103 is stored as data for determining the identity of the object to be registered.

With the object printing device 100 configured and operating as described above, the accuracy of matching for determining the identity of an object can be increased. The reason is that a random pattern of a printed site by a character printed on an object can be more clearly imaged without using a special lighting device than a random pattern caused by the shadow of the object surface, and therefore, can be extracted with high reproducibility.

Fourth Example Embodiment

Figure 22:
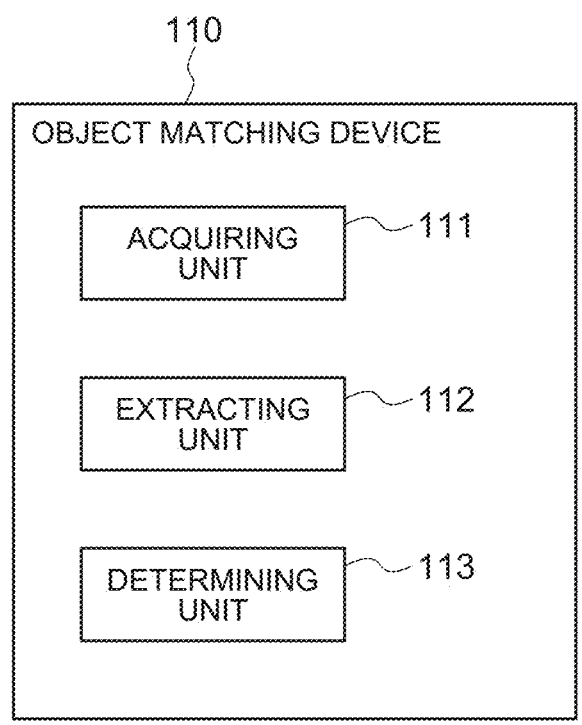
FIG. 22 is a block diagram of an object matching device according to a fourth example embodiment of the present invention.

Next, an object matching device according to a fourth example embodiment of the present invention will be described. FIG. 22 is a block diagram of the object matching device according to this example embodiment.

Referring to FIG. 22, an object matching device 110 according to this example embodiment includes an acquiring unit 111, an extracting unit 112, and a determining unit 113.

The acquiring unit 111 is configured to acquire a captured image of an object to be matched with a character printed thereon. The object may be, for example, a tablet, and may be an object other than a tablet, for example, a confection, a semiconductor component, a mechanical component, and a product package. The acquiring unit 111 can be configured by, for example, a camera, but is not limited thereto. The extracting unit 112 is configured to extract a matching partial image including the abovementioned character from the image acquired by the acquiring unit 111. The extracting unit 112 can be configured, for example, in the same manner as the matching data acquisition unit 52 of the object matching device according to the second example embodiment of the present invention, but is not limited thereto. The determining unit 113 is configured to determine the identity of the object to be matched by comparing the matching partial image extracted by the extracting unit 112 with a registration partial image acquired from an authentic object and registered in advance. The determining unit 113 can be configured, for example, in the same manner as the determination unit 54 of the object matching device according to the second example embodiment of the present invention, but is not limited thereto.

The object matching device 110 thus configured operates in the following manner. First, the acquiring unit 111 acquires a captured image of an object to be matched with a character printed thereon. Next, the extracting unit 112 extracts a matching partial image including the abovementioned character from the image acquired by the acquiring unit 111. Next, the determining unit 113 determines the identity of the object to be matched by comparing the matching partial image extracted by the extracting unit 112 with a registration partial image acquired from an authentic object and registered in advance.

With the object matching device 110 configured and operating as described above, the accuracy of matching for determining the identity of an object can be increased. The reason is that a random pattern of a printed site by a character printed on an object can be more clearly imaged without using a special lighting device than a random pattern caused by the shadow of the object surface, and therefore, can be extracted with high reproducibility.

Other Example Embodiment

Another example embodiment of the present invention will be described.

For example, the tablet printing device according to the first example embodiment and the tablet matching device according to the second example embodiment use outline data of a tablet as data representing the posture of the tablet. However, the data representing the posture of a tablet is not limited to the outline data of the tablet. For example, data representing the orientation of a tablet may be used as data representing the posture of the tablet. The data representing the orientation of a tablet can be, for example, data representing a degree to which the curved face portion 1b of the tablet 1 faces a camera, but is not limited thereto. The orientation of a tablet can be determined from the outline data of the tablet by pattern matching. That is to say, it is possible to prepare outline data of tablets having different orientations as reference outline data, and determine an orientation corresponding to reference outline data that matches registration outline data as the orientation of the tablet at the time of registration, and determine an orientation corresponding to reference outline data that matches matching outline data as the orientation of the tablet at the time of matching. Thus, according to the present invention, the outline data of an object and data representing the orientation of an object can be used as data representing the posture of an object. Moreover, data representing the posture of an object may include, in addition to the outline data of the shape of an object, the outline of a standard pattern applied to the surface of an object as already described in the first and second example embodiments. For example, an object printing device prints a character such as the name of a shipment destination, a shipping number or time and date, a barcode, or the like, by inkjet printing or the like on a product package having a shape such as a rectangle on which a standard pattern with a product name, a picture or a design picture is already printed, and the object printing device is configured to, when printing a character on a product package conveyed by a belt conveyor, extract not only the outline of the shape of the package but also the outline of the standard pattern printed on the package as outline data, and register as registration outline data. Moreover, an object matching device may extract, in addition to outline data of the shape of an object, data representing the outline of a standard pattern applied to the surface of an object as matching outline data from a captured image of a product package to be matched, and use it for matching.

Further, the tablet printing device according to the first example embodiment and the tablet matching device according to the second example embodiment use a partial image including a character and outline data representing the posture of a tablet as data for determining the identity of a tablet, but may be configured to omit outline data representing the posture of a tablet. That is to say, the registration data acquisition unit 23 of the tablet printing device may be configured not to acquire registration outline data. Moreover, the matching data acquisition unit 52 of the tablet matching device may be configured not to acquire matching outline data.

Further, in the tablet printing device according to the first example embodiment, it is assumed that the posture of the tablet 1 hardly changes between at the time of printing and at the time of image acquisition. Moreover, the registration camera 6 is configured to capture an image of the tablet 1 from directly above the tablet 1 as with the inkjet printer 5. However, the posture of the tablet 1 may change between at the time of printing and at the time of image acquisition. A case can also be supposed in which due to restriction of an installation space or the like, the registration camera 6 cannot capture an image of the tablet 1 from directly above the tablet 1 and needs to capture from an oblique direction. In these cases, a registration partial image including a character extracted from an image of the tablet 1 captured by the registration camera 6 distorts as with the case of the tablet matching device. Then, as another aspect of the present invention, the registration data acquisition unit 23 of the tablet printing device may be configured to perform the same correction process as the process performed by the matching data acquisition unit 52 of the tablet matching device (the processing shown in FIGS. 17 and 18).

The present invention is not limited to the example embodiments described above. The configurations and details of the present invention can be changed in various manners that can be understood by one skilled in the art within the scope of the present invention.

The present invention can be used for authenticity determination of an object such as authenticity determination in tablet units.

The whole or part of the example embodiments disclosed above can be described as, but not limited to, the following supplementary notes.

[Supplementary Note 1]

An object matching device comprising:
an acquiring unit configured to acquire an image of an object to be matched with a character printed thereon;
an extracting unit configured to extract a partial image of predetermined size including the character as a matching partial image from the image; and
a determining unit configured to compare the matching partial image with a registration partial image acquired from an object to be registered and registered in advance, and thereby determine an identity of the object to be matched and the object to be registered.

[Supplementary Note 2]

The object matching device according to Supplementary Note 1, wherein:
the extracting unit is configured to extract posture data of the object as matching posture data from the image; and
the determining unit is configured to compare the matching partial image and the matching posture data with a registration partial image and registration posture data acquired from an object to be registered and registered in advance, and thereby determine an identity of the object to be matched and the object to be registered.

[Supplementary Note 3]

The object matching device according to Supplementary Note 2, wherein the matching posture data includes data representing an outline of an outer shape of the object.

[Supplementary Note 4]

The object matching device according to Supplementary Note 2 or 3, wherein the matching posture data includes data representing an outline of a standard pattern applied to a surface of the object.

[Supplementary Note 5]

The object matching device according to any of Supplementary Notes 1 to 4, wherein the extracting unit is configured to compare a region of the character in the image with a reference image of the character, detect distortion of the printed character, and correct the matching partial image based on the detected distortion.

[Supplementary Note 6]

The object matching device according to any of Supplementary Notes 1 to 4, wherein the extracting unit is configured to perform alignment of the image with an object three-dimensional model registered in advance, map the image by texture mapping to the object three-dimensional model after the alignment, determine a viewpoint at which a pattern of the character in the image mapped by texture mapping to the object three-dimensional model matches a reference character pattern, and extract a partial image of predetermined size including the character as the matching partial image from an image of the object three-dimensional model at the determined viewpoint.

[Supplementary Note 7]

The object matching device according to Supplementary Note 6, wherein:
the extracting unit is configured to extract posture data of the object as matching posture data from the image of the object three-dimensional model after the alignment; and
the determining unit is configured to compare the matching partial image and the matching posture data with a registration partial image and registration posture data acquired from an object to be registered and registered in advance, and thereby determine an identity of the object to be matched and the object to be registered.

[Supplementary Note 8]

An object printing device comprising:
a printing unit configured to print a character on an object to be registered;
an acquiring unit configured to acquire an image of the object with the character printed thereon;
an extracting unit configured to extract a partial image of predetermined size including the character as a registration partial image from the image; and
a storing unit configured to have the registration partial image stored therein as data for determining an identity of the object.

[Supplementary Note 9]

The object printing device according to Supplementary Note 8, wherein:
the extracting unit is configured to extract posture data of the object as registration posture data from the image; and
the storing unit is configured to have the registration partial image and the registration posture data stored therein as data for determining an identity of the object.

[Supplementary Note 10]

The object printing device according to Supplementary Note 8 or 9, wherein the extracting unit is configured to compare a region of the character in the image with a reference image of the character, detect distortion of the printed character, and correct the registration partial image based on the detected distortion.

[Supplementary Note 11]

The object printing device according to Supplementary Note 8 or 9, wherein the extracting unit is configured to perform alignment of the image with an object three-dimensional model registered in advance, map the image by texture mapping to the object three-dimensional model after the alignment, determine a viewpoint at which a pattern of the character in the image mapped by texture mapping to the object three-dimensional model matches a reference character pattern, and extract a partial image of predetermined size including the character as the registration partial image from an image of the object three-dimensional model at the determined viewpoint.

[Supplementary Note 12]

The object printing device according to Supplementary Note 11, wherein:
the extracting unit is configured to extract posture data of the object as registration posture data from the image of the object three-dimensional model after the alignment; and
the storing unit is configured to have the registration partial image and the registration posture data stored therein as data for determining an identity of the object.

[Supplementary Note 13]

An object matching method comprising:
acquiring an image of an object to be matched with a character printed thereon;
extracting a partial image of predetermined size including the character as a matching partial image from the image; and
comparing the matching partial image with a registration partial image acquired from an object to be registered and registered in advance, and thereby determining an identity of the object to be matched and the object to be registered.

[Supplementary Note 14]

The object matching method according to Supplementary Note 13, wherein:
in the extracting, posture data of the object is further extracted as matching posture data from the image; and
in the determining, the matching partial image and the matching posture data are compared with a registration partial image and registration posture data acquired from an object to be registered and registered in advance, and thereby an identity of the object to be matched and the object to be registered is determined.

[Supplementary Note 15]

The object matching method according to Supplementary Note 13 or 14, wherein in the extracting, a region of the character in the image is compared with a reference image of the character, distortion of the printed character is detected, and the matching partial image is corrected based on the detected distortion.

[Supplementary Note 16]

The object matching method according to Supplementary Note 13 or 14, wherein in the extracting, alignment of the image with an object three-dimensional model registered in advance is performed, the image is mapped by texture mapping to the object three-dimensional model after the alignment, a viewpoint at which a pattern of the character in the image mapped by texture mapping to the object three-dimensional model matches a reference character pattern is determined, and a partial image of predetermined size including the character is extracted as the matching partial image from an image of the object three-dimensional model at the determined viewpoint.

[Supplementary Note 17]

The object matching method according to Supplementary Note 16, wherein:
in the extracting, posture data of the object is extracted as matching posture data from the image of the object three-dimensional model after the alignment; and
in the determining, the matching partial image and the matching posture data are compared with a registration partial image and registration posture data acquired from an object to be registered and registered in advance, and thereby an identity of the object to be matched and the object to be registered is determined.

[Supplementary Note 18]

An object printing method comprising:
printing a character on an object to be registered;
acquiring an image of the object with the character printed thereon;
extracting a partial image of predetermined size including the character as a registration partial image from the image; and
storing the registration partial image as data for determining an identity of the object.

[Supplementary Note 19]

The object printing method according to Supplementary Note 18, wherein:
in the extracting, posture data of the object is further extracted as registration posture data from the image; and
in the storing, the registration partial image and the registration posture data are stored as data for determining an identity of the object.

[Supplementary Note 20]

The object printing method according to Supplementary Note 18 or 19, wherein in the extracting, a region of the character in the image is compared with a reference image of the character, distortion of the printed character is detected, and the registration partial image is corrected based on the detected distortion.

[Supplementary Note 21]

The object printing method according to Supplementary Note 18 or 19, wherein in the extracting, alignment of the image with an object three-dimensional model registered in advance is performed, the image is mapped by texture mapping to the object three-dimensional model after the alignment, a viewpoint at which a pattern of the character in the image mapped by texture mapping to the object three-dimensional model matches a reference character pattern is determined, and a partial image of predetermined size including the character is extracted as the registration partial image from an image of the object three-dimensional model at the determined viewpoint.

[Supplementary Note 22]

The object printing method according to Supplementary Note 21, wherein:
in the extracting, posture data of the object is extracted as registration posture data from the image of the object three-dimensional model after the alignment; and
in the storing, the registration partial image and the registration posture data are stored as data for determining an identity of the object.

[Supplementary Note 23]

A non-transitory computer-readable recording medium having a program recorded thereon, the program comprising instructions for causing a computer to function as:
- an acquiring unit configured to acquire an image of an object to be matched with a character printed thereon;
- an extracting unit configured to extract a partial image of predetermined size including the character as a matching partial image from the image; and
- a determining unit configured to compare the matching partial image with a registration partial image acquired from an object to be registered and registered in advance, and thereby determine an identity of the object to be matched and the object to be registered.

[Supplementary Note 24]

A non-transitory computer-readable recording medium having a program recorded thereon, the program comprising instructions for causing a computer to function as:
- an acquiring unit configured to acquire an image of an object to be registered with a character printed thereon;
- an extracting unit configured to extract a partial image of predetermined size including the character as a registration partial image from the image; and
- a registering unit configured to register the registration partial image as data for determining an identity of the object into a storing unit.

DESCRIPTION OF NUMERALS 1 tablet
1a curved face portion
1b curved face portion
1c side face portion
2 hopper
3 belt conveyor
4 detection camera
5 inkjet printer
6 registration camera
7 database
8 control unit
9 faultless item storage box
12 faulty item discharge unit
13 faulty item discharge box
14 image data used as printing data
15 printed site
16 printed site
21 printing control unit
22 faulty item detection unit
23 registration data acquisition unit
31 communication interface unit
32 operation input unit
33 screen display unit
34 storage unit
35 arithmetic logic unit
36 information processing device
37 program
41 image including tablet after printing
42 registration partial image
43 outline data
45-1 to 45-n registration partial image
46-1 to 46-n registration outline data
51 camera
52 matching data acquisition unit
53 database
54 determination unit
55 output unit
60 camera
61 communication interface unit
62 operation input unit
63 screen display unit
64 storage unit
65 arithmetic logic unit
66 information processing unit
67 program
71 image
71a, 71b, 71c, 71d vertex
72 image data as printing data
72a, 72b, 72c, 72d vertex
100 object printing device
101 printing unit
102 acquiring unit
103 extracting unit
104 storing unit
110 object matching device
111 acquiring unit
112 extracting unit
113 determining unit

What is claimed is:

1. An object matching device comprising:
a processor; and
a memory storing executable instructions that, when executed by the processor, causes the processor to perform as:
an acquiring unit configured to acquire an image of an object to be matched with a character printed thereon;
an extracting unit configured to extract a partial image of predetermined size including the character as a matching partial image from the image; and
a determining unit configured to compare the matching partial image with a registration partial image acquired from an object to be registered and registered in advance, and thereby determine an identity of the object to be matched and the object to be registered, wherein
the extracting unit is configured to extract posture data of the object as matching posture data from the image; and
the determining unit is configured to compare the matching partial image and the matching posture data with a registration partial image and registration posture data acquired from an object to be registered and registered in advance, and thereby determine an identity of the object to be matched and the object to be registered.

2. The object matching device according to claim 1, wherein the matching posture data includes data representing an outline of an outer shape of the object.

3. The object matching device according to claim 1, wherein the matching posture data includes data representing an outline of a standard pattern applied to a surface of the object.

4. The object matching device according to claim 1, wherein the extracting unit is configured to compare a region of the character in the image with a reference image of the character, detect distortion of the printed character, and correct the matching partial image based on the detected distortion.

5. An object matching device comprising:
a processor; and
a memory storing executable instructions that, when executed by the processor, causes the processor to perform as:
an acquiring unit configured to acquire an image of an object to be matched with a character printed thereon;

an extracting unit configured to extract a partial image of predetermined size including the character as a matching partial image from the image; and a determining unit configured to compare the matching partial image with a registration partial image acquired from an object to be registered and registered in advance, and thereby determine an identity of the object to be matched and the object to be registered, wherein the extracting unit is configured to perform alignment of the image with an object three-dimensional model registered in advance, map the image by texture mapping to the object three-dimensional model after the alignment, determine a viewpoint at which a pattern of the character in the image mapped by texture mapping to the object three-dimensional model matches a reference character pattern, and extract a partial image of predetermined size including the character as the matching partial image from an image of the object three-dimensional model at the determined viewpoint.

6. The object matching device according to claim 5, wherein:

the extracting unit is configured to extract posture data of the object as matching posture data from the image of the object three-dimensional model after the alignment; and the determining unit is configured to compare the matching partial image and the matching posture data with a registration partial image and registration posture data acquired from an object to be registered and registered in advance, and thereby determine an identity of the object to be matched and the object to be registered.

7. An object matching method comprising:

acquiring an image of an object to be matched with a character printed thereon;

extracting a partial image of predetermined size including the character as a matching partial image from the image; and comparing the matching partial image with a registration partial image acquired from an object to be registered and registered in advance, and thereby determining an identity of the object to be matched and the object to be registered, wherein:

in the extracting, posture data of the object is further extracted as matching posture data from the image; and in the determining, the matching partial image and the matching posture data are compared with a registration partial image and registration posture data acquired from an object to be registered and registered in advance, and thereby an identity of the object to be matched and the object to be registered is determined.

8. The object matching method according to claim 7, wherein in the extracting, a region of the character in the image is compared with a reference image of the character, distortion of the printed character is detected, and the matching partial image is corrected based on the detected distortion.

9. An object matching method comprising:

acquiring an image of an object to be matched with a character printed thereon;

extracting a partial image of predetermined size including the character as a matching partial image from the image; and comparing the matching partial image with a registration partial image acquired from an object to be registered and registered in advance, and thereby determining an identity of the object to be matched and the object to be registered, wherein in the extracting, alignment of the image with an object three-dimensional model registered in advance is performed, the image is mapped by texture mapping to the object three-dimensional model after the alignment, a viewpoint at which a pattern of the character in the image mapped by texture mapping to the object three-dimensional model matches a reference character pattern is determined, and a partial image of predetermined size including the character is extracted as the matching partial image from an image of the object three-dimensional model at the determined viewpoint.

10. The object matching method according to claim 9, wherein:

in the extracting, posture data of the object is extracted as matching posture data from the image of the object three-dimensional model after the alignment; and in the determining, the matching partial image and the matching posture data are compared with a registration partial image and registration posture data acquired from an object to be registered and registered in advance, and thereby an identity of the object to be matched and the object to be registered is determined.

* * * * *